US010045209B1

(12) United States Patent
Ziraknejad

(10) Patent No.: US 10,045,209 B1
(45) Date of Patent: Aug. 7, 2018

(54) ARRANGING DISPLAY OF CONTROL ICONS THAT ENABLE USAGE OF KEYS

(71) Applicant: MicroStrategy Incorporated, Vienna, VA (US)

(72) Inventor: Siamak Ziraknejad, Reston, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 15/790,873

(22) Filed: Oct. 23, 2017

Related U.S. Application Data

(63) Continuation of application No. 14/599,062, filed on Jan. 16, 2015, now Pat. No. 9,801,053.

(60) Provisional application No. 61/928,552, filed on Jan. 17, 2014.

(51) Int. Cl.
| | |
|---|---|
| *H04L 29/06* | (2006.01) |
| *H04W 12/04* | (2009.01) |
| *H04W 4/02* | (2018.01) |
| *H04W 12/06* | (2009.01) |

(52) U.S. Cl.
CPC ............ *H04W 12/04* (2013.01); *H04L 63/06* (2013.01); *H04L 63/08* (2013.01); *H04W 4/026* (2013.01); *H04W 12/06* (2013.01)

(58) Field of Classification Search
CPC .................................................. H04W 4/026
See application file for complete search history.

(56) References Cited

U.S. PATENT DOCUMENTS

2006/0294388 A1* 12/2006 Abraham .............. G06F 21/305
713/182

* cited by examiner

*Primary Examiner* — Tri Tran
(74) *Attorney, Agent, or Firm* — Fish & Richardson P.C.

(57) ABSTRACT

A user of a mobile device is authenticated in a manner that enables the user access to a credential that has been issued by a credential-issuing organization. One or more keys are identified that are associated with the credential and that enable access to one or more physical resources associated with the credential-issuing organization. A physical orientation of the user's mobile device is determined. A display arrangement of one or more control icons that enable usage of the one or more keys is determined based on a physical orientation of the one or more physical resources relative to the determined physical orientation of the mobile device. The one or more control icons are displayed in accordance with the determined display arrangement.

20 Claims, 19 Drawing Sheets

ARRANGING DISPLAY OF CONTROL ICONS THAT ENABLE USAGE OF KEYS

CROSS-REFERENCE TO RELATED APPLICATIONS

This application is a continuation (and claims the benefit of priority under 35 USC 120) of U.S. application Ser. No. 14/599,062, filed Jan. 16, 2015, now allowed, which claims the benefit of U.S. Provisional Application No. 61/928,552, filed Jan. 17, 2014, and titled "Arranging Display of Control Icons that Enable Usage of Keys." Both of these prior applications are incorporated by reference in their entirety.

TECHNICAL FIELD

This disclosure relates to arranging display of control icons that enable usage of keys.

BACKGROUND

Private and public organizations issue credentials to persons, for example, to signify completion of a set of requirements, membership in a particular group, permissions and/or authorizations that have been conferred to such persons, etc. Persons may use the credentials to verify completion of the set of requirements, membership in the particular group, possession of such permissions and/or authorizations, etc.

SUMMARY

In one aspect, a method includes authenticating a user of a mobile device in a manner that enables the user access to a credential that has been issued to the user by a credential-issuing organization, and identifying one or more keys that are associated with the credential and that enable access to one or more physical resources associated with the credential-issuing organization. The method also includes determining a physical orientation of the mobile device of the user, indicating a geographic direction in which the mobile device is facing; determining a display arrangement of one or more control icons that enable usage of the one or more keys based on a physical orientation of the one or more physical resources relative to the determined physical orientation of the mobile device of the user; and causing display of the one or more control icons in accordance with the determined display arrangement.

In some implementations, identifying one or more keys that are associated with the credential and that enable access to one or more physical resources associated with the credential-issuing organization may include receiving, from the mobile device of the user, a selection of a group key that corresponds to the one or more keys; and identifying the one or more keys that correspond to the selected group key.

In some implementations, determining a physical orientation of the mobile device of the user may include receiving geographic directional information from a geographic direction sensing device of the mobile device of the user. In some implementations, receiving directional information from a geographic direction sensing device of the mobile device of the user may include receiving an indication of a detected geographic direction from at least one of a compass, a gyroscope, an accelerometer, or a proximity sensor of the mobile device of the user; and determining the geographic direction in which the mobile device of the user is facing as the detected geographic direction.

In some implementations, determining a physical orientation of the mobile device of the user may include receiving a photographed image captured by an image sensor; processing the photographed image; and determining, based on processing the photographed image, a geographic direction in which the user is facing. In some implementations, determining a physical orientation of the mobile device of the user may include determining a viewing orientation in which the mobile device of the user is being held and viewed by the user.

In some implementations, identifying the one or more keys may include identifying a subset of keys that are accessible to the user. In these implementations, determining the display arrangement of the one or more control icons may include determining a subset of control icons that corresponds to the identified subset of keys. Also in these implementations, causing display of the one or more control icons in accordance with the determined display arrangement may include indicating accessibility of only the subset of control icons that corresponds to the identified subset of keys.

In some implementations, determining the display arrangement of the one or more control icons may include identifying, from among a plurality of predefined orientations, an orientation that is a closest match to the physical orientation of the one or more physical resources relative to the determined physical orientation of the mobile device of the user; and identifying, from among a plurality of predefined graphical key selection interfaces, a graphical key selection interface that includes the one or more control icons arranged according to the identified orientation. In these implementations, causing display of the one or more control icons in accordance with the determined display arrangement may include providing, to the mobile device of the user, the identified graphical key selection interface.

In some implementations, determining the display arrangement of the one or more control icons may include generating a graphical key selection interface that includes the one or more control icons arranged according to the physical orientation of the one or more physical resources relative to the determined physical orientation of the mobile device of the user. In these implementations, causing display of the one or more control icons in accordance with the determined display arrangement may include providing, to the mobile device of the user, the generated graphical key selection interface.

In some implementations, the method may include receiving, from the mobile device of the user, a selection of a particular control icon from the one or more control icons; and enabling the user to use a particular key, from among the one or more keys, that corresponds to the selected control icon to access a particular physical resource from among the one or more physical resources.

In some implementations, the method may include determining a geographic location of the mobile device of the user. In some implementations, determining the geographic location of the mobile device of the user may include receiving an indication of a geographic location from a location-sensing device of the mobile device of the user. In some implementations, determining the geographic location of the mobile device of the user may include processing triangulation information received from a plurality of devices that are in communication with the mobile device of the user. In some implementations, identifying one or more keys that are associated with the credential and that enable access to one or more physical resources associated with the credential-issuing organization may include determining a geographic region associated with the one or more physical resources; comparing the geographic location of the mobile device of the user with the geographic region associated with the one or more physical resources; and determining a match between the geographic location of the mobile device of the user and the geographic region associated with the one or more physical resources, and determining that the one or more keys correspond to the one or more physical resources for which the associated geographic region was determined to match the geographic location of the mobile device of the user.

In some implementations, the method may include determining one or more credential-issuing organizations having associated physical resources that are in a vicinity of the geographic location of the mobile device of the user; and providing, to the mobile device of the user, information regarding the one or more credential-issuing organizations and the associated physical resources that are in the vicinity of the geographic location of the mobile device of the user.

In some implementations, authenticating a user of a mobile device may include receiving, from the mobile device of a user, authentication information associated with the credential and the one or more keys issued by the credential-issuing organization; and determining that the authentication information has been authorized by the credential-issuing organization.

In some implementations, the method may include receiving, from a system operated by the credential-issuing organization, the credential and the one or more keys issued to the user by the credential-issuing organization; and adding the credential and the one or more keys to a user account of the user.

In some implementations, the method may include providing, to the mobile device of the user, based on determining that the user's authentication information has been authorized, a representation of a credential that includes at least one of a Quick Response (QR) Code, an alphanumeric code, or a short-range wireless code.

In another aspect, a system includes one or more computers and one or more storage devices storing instructions that are operable, when executed by the one or more computers, to cause the one or more computers to perform operations that include authenticating a user of a mobile device in a manner that enables the user access to a credential that has been issued to the user by a credential-issuing organization, and identifying one or more keys that are associated with the credential and that enable access to one or more physical resources associated with the credential-issuing organization. The operations also include determining a physical orientation of the mobile device of the user; determining a display arrangement of one or more control icons that enable usage of the one or more keys based on a physical orientation of the one or more physical resources relative to the determined physical orientation of the mobile device of the user; and causing display of the one or more control icons in accordance with the determined display arrangement.

In another aspect, at least one computer-readable storage medium encoded with at least one computer program including instructions that, when executed, operate to cause at least one processor to perform operations that include authenticating a user of a mobile device in a manner that enables the user access to a credential that has been issued to the user by a credential-issuing organization, and identifying one or more keys that are associated with the credential and that enable access to one or more physical resources associated with the credential-issuing organization. The operations also include determining a physical orientation of the mobile device of the user; determining a display arrangement of one or more control icons that enable usage of the one or more keys based on a physical orientation of the one or more physical resources relative to the determined physical orientation of the mobile device of the user; and causing display of the one or more control icons in accordance with the determined display arrangement.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

DETAILED DESCRIPTION

Figure 1:
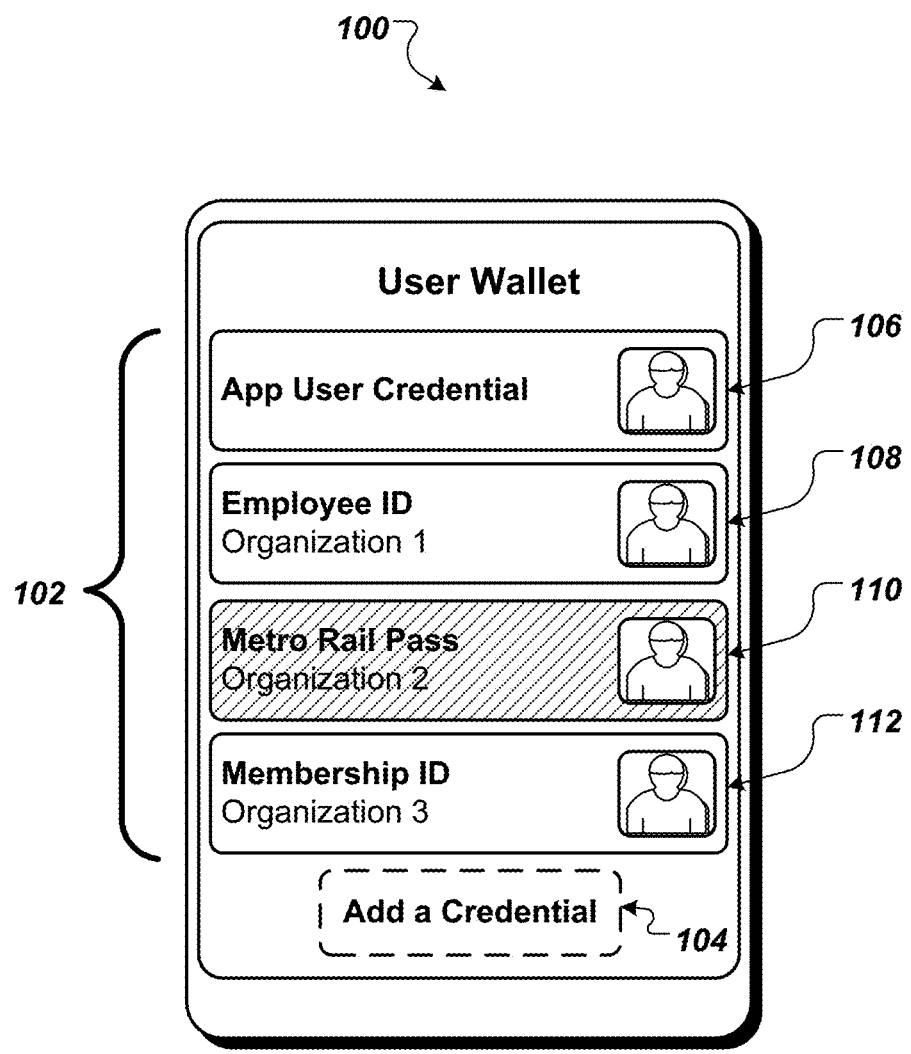
FIGS. 1-3, 5-8, and 10-13 are diagrams illustrating example user interfaces for using credentials and related resources, such as keys.

Techniques are described for arranging display of control icons that enable usage of keys associated with credentials. As examples, the credentials may be a status denoting membership in a particular group (e.g., a badge of employment issued by a company, a gym membership, etc.), licenses issued by government organizations (e.g., a license to practice medicine, a driver's license, a passport, a travel visa, etc.), degrees issued by institutes of learning (e.g., a collegiate degree issued by a university), or any type of credential an organization or institute bestows on individuals.

A credential may have associated with it one or more resources, such as keys, that a user has been granted by the credential-issuing organization. For example, the keys may be software-based objects that enable the user to access physical resources (e.g., opening a door to a secured office, operating an elevator in a building with access-controlled floors, using equipment with restricted access, etc.) or may enable the user to access logical resources (e.g., accessing information stored in a computing device, etc.).

In some implementations, a mobile device-based credential management application enables multiple different credential-issuing organizations to use the application to distribute and manage electronic credentials and related resources, such as keys, that are issued by the credential-issuing organizations. In some examples, the credential management application may be hosted by an entity that is separate from the credential-issuing organizations. The credential-issuing organizations may use the credential management application to provide users with access to credentials and associated keys that enable the users to access different physical resources associated with the credential-issuing organizations. As an example, if a user has been issued an employee ID by a credential-issuing organization, then the organization may also issue to the user one or more keys to access various physical resources associated with the organization, such as offices, elevators, parking garages, etc.

In certain situations, the credential management application may present the keys to a user as groups of keys, for example, where the keys in a group of keys are related to a common group of physical resources. In some implementations, such related keys may be represented by a single group key within the user interface of the mobile device when displayed to a user. When the user selects a particular group key, the mobile device may display one or more control icons that correspond to the keys that are associated with the selected group key. In some implementations, the control icons may be selectable user interface components that enable the user to use the keys to access the physical resources. The display of the control icons may reflect the relative locations of the physical resources that correspond to the keys from the group key.

For example, a set of elevators in an office building may correspond to a single group key, and when the user selects that group key, the user's mobile device may display one or more control icons representing the elevators. In some implementations, the display of the control icons may be based on determining a physical orientation of the corresponding physical resources relative to a physical orientation of the user's mobile device. The control icons also may be selectively accessible by the user, depending on authorization granted to the user's credential by the credential-issuing organization. For example, one or more elevators in the set of elevators may be inaccessible to the user, and the credential management application may indicate the inaccessibility of those elevators when displaying the control icons to the user.

As such, the credential management application may facilitate a user's access to groups of physical resources, and may also facilitate a credential-issuing organization's selective control of user access to individual physical resources within the groups of physical resources. The application may present an authorized user with a single group key that represents one or more keys corresponding to a common set of physical resources, detect the physical orientation of the mobile device of the user, and present the user with a graphical interface that displays control icons corresponding to a physical orientation of the physical resources relative to the orientation of the user. Some of the control icons may be inaccessible to the user based on the level of authorization granted by the credential-issuing organization.

In some implementations, in addition to the physical orientation of a user's mobile device, the physical location of the user's mobile device may also be determined and used by the credential management application to facilitate and manage a user's access to a group of physical resources. For example, the location of the user's mobile device may be displayed together with the control icons to indicate the user's location relative to the relevant physical resources. Other examples include using the physical location of the user's mobile device to facilitate determination of the user's physical orientation or to facilitate authorizing the user's access to the physical resources.

The display of the control icons may be rearranged as the orientation and/or location of the user's mobile device changes, so that the control icons maintain correspondence to the physical orientation of the physical resources relative to the physical orientation of the mobile device of the user. For example, if the user is trying to access a set of elevators and the user (and the user's mobile device) moves from one end of the elevator bank to the opposite end of the elevator bank and turns around, then the control icons representing the elevators may be rearranged (e.g., rotated 180 degrees) to represent the physical orientation of the elevators relative to the user's new physical orientation. Such rearrangement of the control icons may be displayed using any suitable change in the display of the control icons. As an example, the rearrangement may be displayed using a continuously changing graphical animation of control icons that tracks the user's change in physical orientation in approximately real-time, or may be displayed with a discontinuous change from a first display of control icons that corresponds to the user's first physical orientation to a second display of control icons that corresponds to the user's second physical orientation.

Figure 2:
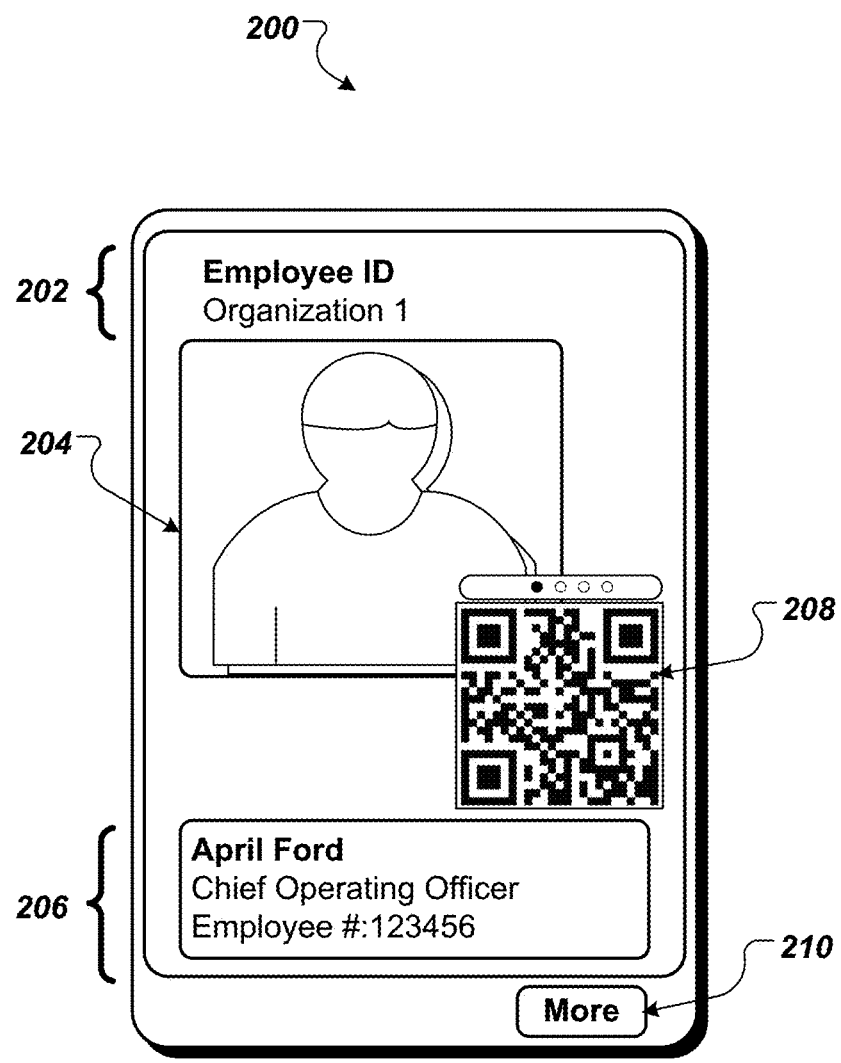
Figure 3:
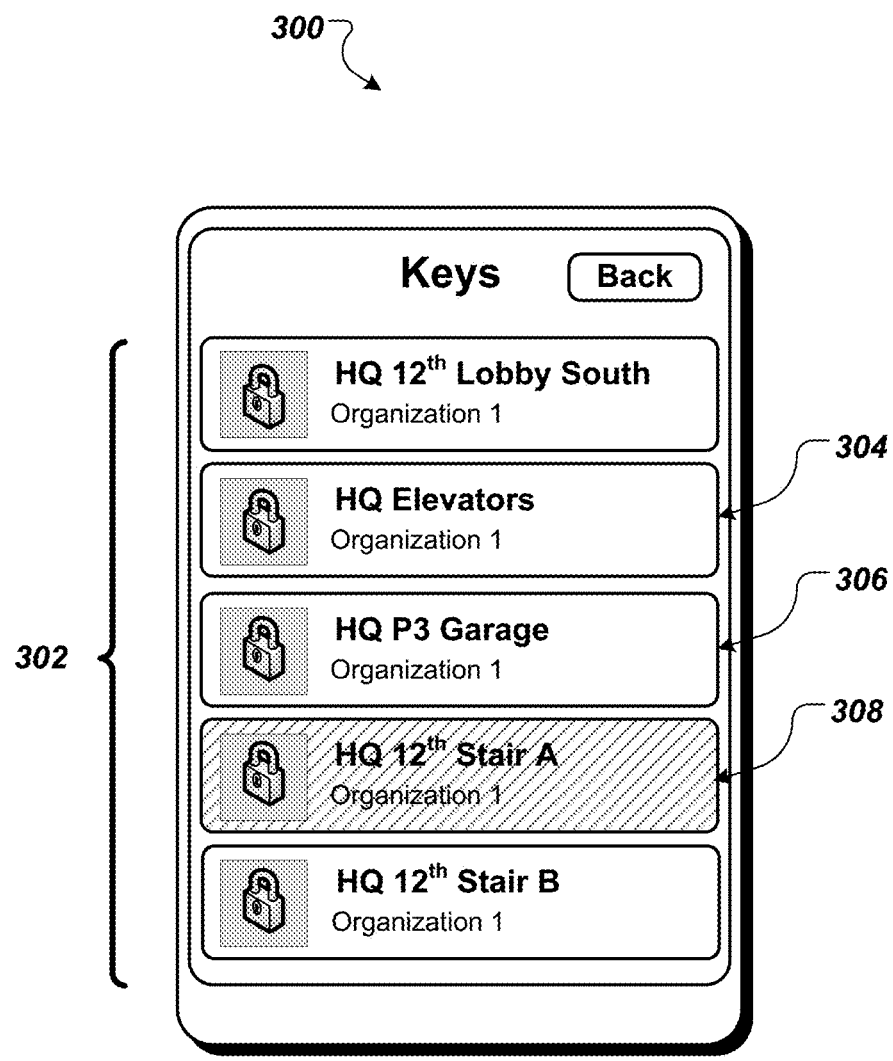

FIGS. 1-3 illustrate user interfaces for displaying information related to credentials and related resources, such as keys. These interfaces may be displayed on a client device running a mobile credential management application. In these examples, the interfaces represent the user account of a user of the credential management application on a client device and may include credentials issued by one or more credential-issuing organizations.

Regardless of which entity processes the user's authentication information and authorizes a user to log-in to the credential management application, the credential management application enables a variety of different credential issuing organizations to issue mobile device-based credentials and/or keys through the credential management application. For example, FIG. 1 illustrates an example of a user's credentials issued by different organizations.

As illustrated in FIG. 1, an example user interface 100 is shown that illustrates a collection of the credentials 102 held by a particular user. In this example, the user interface 100 shows four different credentials for the particular user corresponding to four different credential-issuing organizations. The user also may select the "Add a Credential" tab 104 to add new credentials to the user's account. The credentials that are displayed in the list of credentials 102 in user interface 100 may either be accessible or inaccessible to a user depending on security settings that have been established by credential-issuing organizations and/or the user.

In this example, the list of credentials 102 includes three accessible credentials, and one inaccessible credential. Option 106, which is accessible, may be selected to access credentials issued by the server that hosts the credential management application. Another accessible credential is an employee ID, selectable using option 108, issued by Organization 1. In this example, there is also a third credential option 110 for Organization 2, which the user does not have access to. Another accessible credential is a membership ID, selectable using option 112, issued by Organization 3. The user may select one of the credentials in the list of credentials 102 to view more information about the credential. For instance, when the user selects the Employee ID option 108 for Organization 1, more information about the credential is displayed on the user's mobile device, as illustrated in FIG. 2.

Referring now to FIG. 2, an example user interface 200 is illustrated that displays a selected credential. In this example, the selected credential is the employee ID credential that was selected using option 108 for Organization 1 in the user interface 100 of FIG. 1. The user interface 200 includes a description of the selected credential in text display area 202 and a picture 204 of the user that holds the credential. Also, the user interface 200 includes personal information of the credential holder in text display area 206. In some implementations, some or all of the information displayed in the user interface 200 may have been provided by the organization issuing the credential, in this case Organization 1. The interface 200 also includes a validation mechanism 208. The validation mechanism 208 may be used for validation of the user's credential by other users or entities. In the example shown in FIG. 2, the validation mechanism 208 is a Quick Reference (QR) code. Another user or entity may use a validating device to image the QR code, extract credential information encoded within the QR code, and send the extracted credential information to the credential management system (or the credential-issuing organization) for validation.

In some implementations, as an alternative or in addition to a QR code, the validation mechanism 208 may be an alphanumeric code and/or the validation mechanism 208 may be an indication that credential information is available for transmission using ultrasonic communications, near field communications (NFC), and/or other short-wavelength radio transmissions (e.g., in the ISM band from 2400-2480 MHz), for example, according to the Bluetooth standard. The user interface 200 further includes a button 210 that causes additional information to be displayed related to the credential, such as keys that have been issued to the user by Organization 1. For instance, when the user selects the button 210, the user's mobile device may display the user interface 300 illustrated in FIG. 3.

When a credential-issuing organization issues a credential to a user through the credential management application, it also may issue one or more keys to the user (e.g., for the purposes of providing access to one or more physical and/or logical resources controlled by the credential-issuing organization). For example, when Organization 1 issues an employee ID to the user, it also may issue a number of keys to the user that enable the user to unlock different doors within the Organization 1 office buildings, to gain access to certain floors within Organization 1 facilities, to enter/exit a parking garage associated with Organization 1, etc. In some implementations, the keys are associated with access control systems that regulate access to the physical and/or logical resources and enable the physical and/or logical resources to be locked or unlocked by invocation of a control within the credential management application on the user's mobile device.

Various examples of different keys that an organization may issue to an employee as part of issuing the employee an employee credential through the credential management application are shown in FIG. 3.

Referring now to FIG. 3, an example user interface 300 is illustrated that displays a list of keys associated with a credential. In this example, the user interface 300 shows a list 302 of keys that have been issued to the user in connection with the employee ID credential that was selected using option 108 for Organization 1 in the user interface 100 of FIG. 1. The keys enable the user to access various physical resources that are controlled by Organization 1. Each entry of the list of keys 302 may correspond to a single key corresponding to a single physical resource or may correspond to a group of keys associated with a group of physical resources. Each entry of the list of keys 302 displays a name of a physical resource associated with the key. Some or all of the information in the list 302 displayed about the keys may be provided by the organization issuing the keys, in this case Organization 1.

For example, selectable user interface component 304 corresponds to a group key that represents multiple keys that enable access to elevators in headquarters for Organization 1, at least some of which are accessible to the user. Selectable user interface component 306 corresponds to a group key that represents multiple keys that enable access to entrance and exit lanes in a parking garage in the headquarters for Organization 1, at least some of which are accessible to the user. Selectable user interface component 308 corresponds to a single key that enables access to the 12th floor stairway of the headquarters for Organization 1, which is not accessible to the user.

In this example, the group key for "HQ 12th Stair A," corresponding to user interface component 308, may be inaccessible to the user for various reasons. For example, access to a key may be conditional based on the physical orientation of the user and/or the user's mobile device (e.g., the user and/or the user's mobile device must be facing a particular direction to access a physical resource), or based on the physical location of the user's mobile device (e.g., the user's mobile device must be located within a certain distance of a physical resource), or based on a timing condition (e.g., during normal business hours), or based on preferences specified by the credential-issuing organization (e.g., due to planned events) and/or the user (e.g., to prevent other users of the mobile device from accessing a key). In general, keys that are inaccessible may nonetheless be displayed to a user for any suitable reasons (e.g., for promotional reasons if a merchant wants to advertise an item or service that, if purchased by the user, would cause an inaccessible key to become accessible to the user).

The user may select one of the user interface components in the list 302 to view details about a particular key or a particular group key. For instance, when the user selects the HQ Elevators key, selectable by option 304, information about one or more keys associated with elevators is displayed on the user's mobile device, as described below in relation to FIGS. 5-8. Similarly, when the user selects the HQ P3 Garage key, selectable by option 306, information about one or more keys associated with entrances and exit lanes is displayed on the user's mobile device, as described below in relation to FIGS. 10-13.

As illustrated in the user interface 300 of FIG. 3, among the keys that Organization 1 issued to the user as part of issuing the user an employee credential are a first group of keys for elevators in the Organization 1 building (corresponding to user interface component 304) and a second group of keys for the Organization 1 parking garage (corresponding to user interface component 306). These groups of keys may be grouped together because the user will know in advance that he needs to use one of the keys (e.g., while waiting in the elevator lobby for an elevator) but the user may not know right away which key he is going to need to use (e.g., the user may not know which key he needs to use until a specific elevator arrives).

Continuing with this example, within the Organization 1 building, there are 6 different elevators, all accessible from common elevator lobbies on each floor. The diagram in FIG. 4 below illustrates an example of a physical configuration of the elevators in the Organization 1 building.

Figure 4:
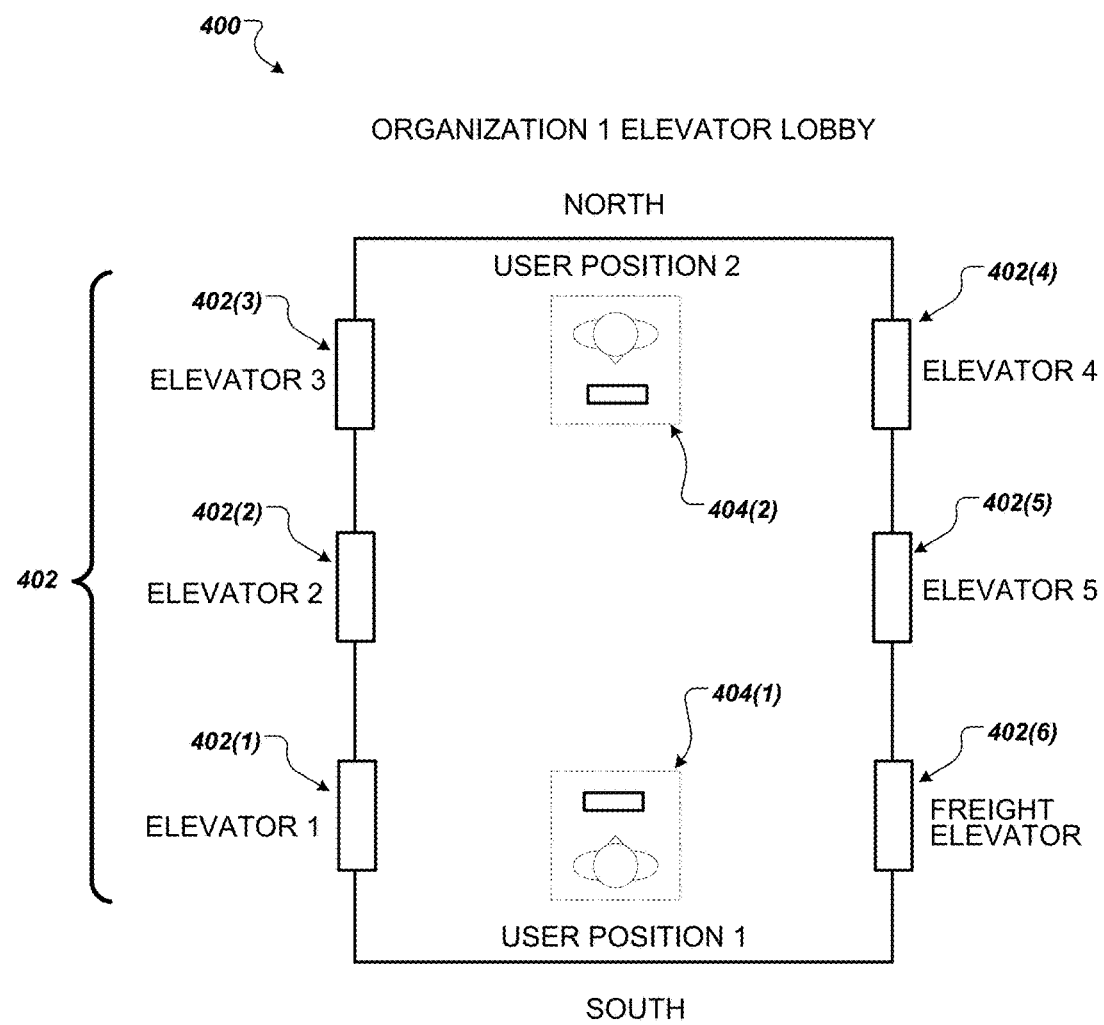
FIGS. 4 and 9 are diagrams illustrating examples of physical resources that are accessible with keys associated with credentials issued by credential-issuing organizations.

Referring now to FIG. 4, an example physical configuration 400 is illustrated that shows physical resources that are accessible by one or more keys. In this example, within the building of Organization 1, there is a set of elevators 402 that includes 6 different elevators, labeled by 402(1), 402(2), 402(3), 402(4), 402(5), and 402(6), in an elevator lobby. The example also illustrates two possible physical orientations of a mobile device of a user. A first physical orientation 404(1) corresponds to the mobile device of the user facing north. The second physical orientation 404(2) corresponds to the mobile device of the user facing south. In addition to two different physical orientations of the mobile device of a user, this example also illustrates two different geographic locations of the user, User Position 1 (corresponding to physical orientation 404(1)) located at the south end of the lobby, and User Position 2 (corresponding to physical orientation 404(2)) located at the north end of the lobby.

This set of 6 elevators may be accessible by the user selecting a single group key (e.g., by selecting the interface component 304 in FIG. 3). When the user selects a particular group key, the credential management application may determine whether the user is authorized to access at least one of the physical resources represented by the group key. Additionally or alternatively, in some implementations, this determination of user authorization to access the physical resources represented by the group key may be performed at other suitable times, such as when the application displays the group key to the user (e.g., in interface 300 of FIG. 3) or later when the user attempts to access a particular physical resource from among the group of physical resources (e.g., as described below in relation to FIG. 8).

Figure 5:
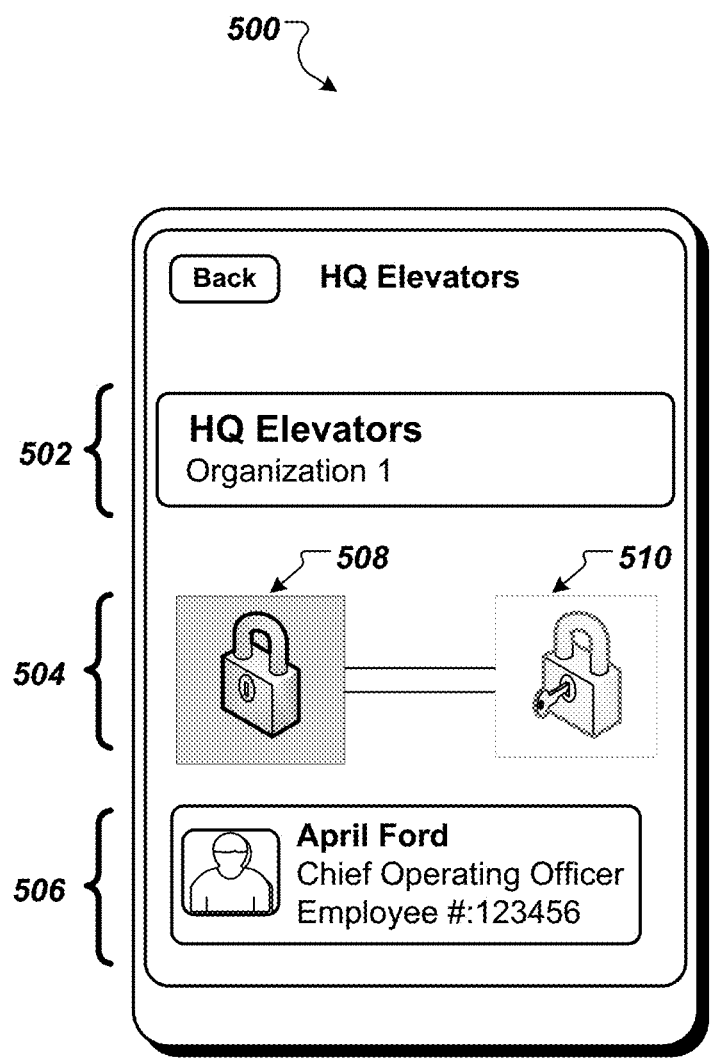

Referring now to FIG. 5, an example user interface 500 is illustrated that displays information about a selected group key. In this example, the group key is associated with the group of elevators 402 in the lobby of the Organization 1 headquarters illustrated in FIG. 4. The user interface 500 includes a text display 502 that describes the group key and a slideable interface component 504 that enables the user to use the group key to access the group of physical resources (e.g., the set of 6 elevators 402 in FIG. 4). The interface 500 also may display information about the user in text display area 506. In this example, the user may use the group key to access the group of physical resources (e.g., the set of 6 elevators 402 in FIG. 4) by sliding the key-shaped icon in the slideable interface component 504 from a "locked" position 508 to an "unlocked" position 510. Other types of interface options may be presented by interface 500 for providing access to the group of physical resources using the group key. In this example, when the user operates the slideable interface component 504 to slide the key-shaped icon the unlocked position 510, a menu for the six elevator keys may be displayed to the user so that the user can select the appropriate key to use when the user knows which elevator he/she will be riding, as illustrated in the interface 600 illustrated in FIG. 6.

Figure 6:
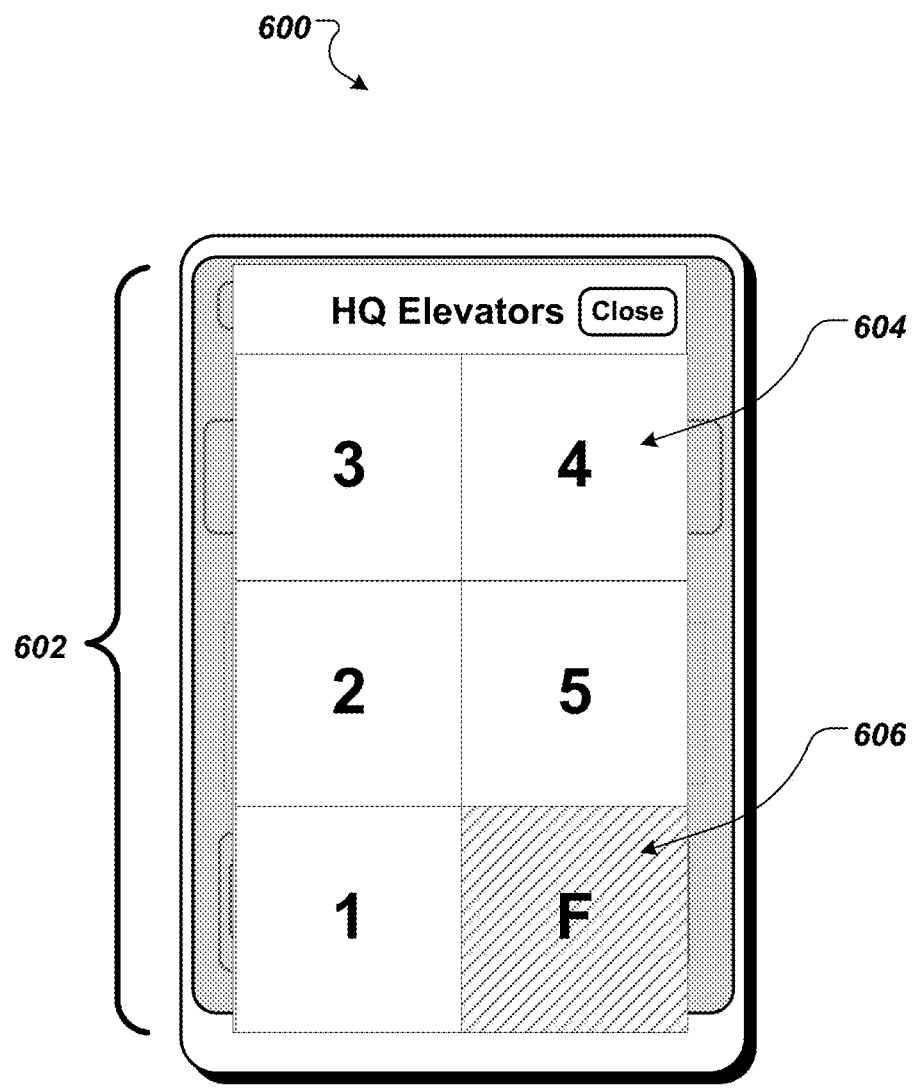

Referring now to FIG. 6, a user interface 600 is illustrated that displays a set of control icons, corresponding to a particular physical orientation of a user, for selecting among a set of keys associated with a group key that has been selected by a user to access a set of physical resources. In this example, the interface 600 displays control icons 602 representing a physical orientation of the 6 elevators 402 in FIG. 4 relative to the first physical orientation 404(1) of the user, at User Position 1 on the south end of the lobby. As illustrated in the user interface 600 of FIG. 6, in order to help the user select the correct key for a desired elevator, such as the key for elevator #4 corresponding to control icon 604, the interface 600 displays the control icons 602 in a manner that reflects the relative locations of the 6 elevators to which the keys correspond.

In this example, the display of the icons 602 is presented in a manner that is consistent with the first physical orientation 404(1) of the user relative to the elevators illustrated in FIG. 4. In contrast, if the application determines that the mobile device of the user is oriented in the second physical orientation 404(2), corresponding to User Position 2 in FIG. 4, then the control icons would be displayed as illustrated in the user interface 700 of FIG. 7.

In some implementations, some of the control icons may be indicated as being inaccessible to the user. This may be a result of the credential-issuing organization specifying, as part of issuing a credential to the user, that certain physical resources are not accessible by the user, based on the user's authorization level. For example, in FIG. 6, user interface component 606 (corresponding to the freight elevator) is indicated as being inaccessible to the user.

Figure 7:
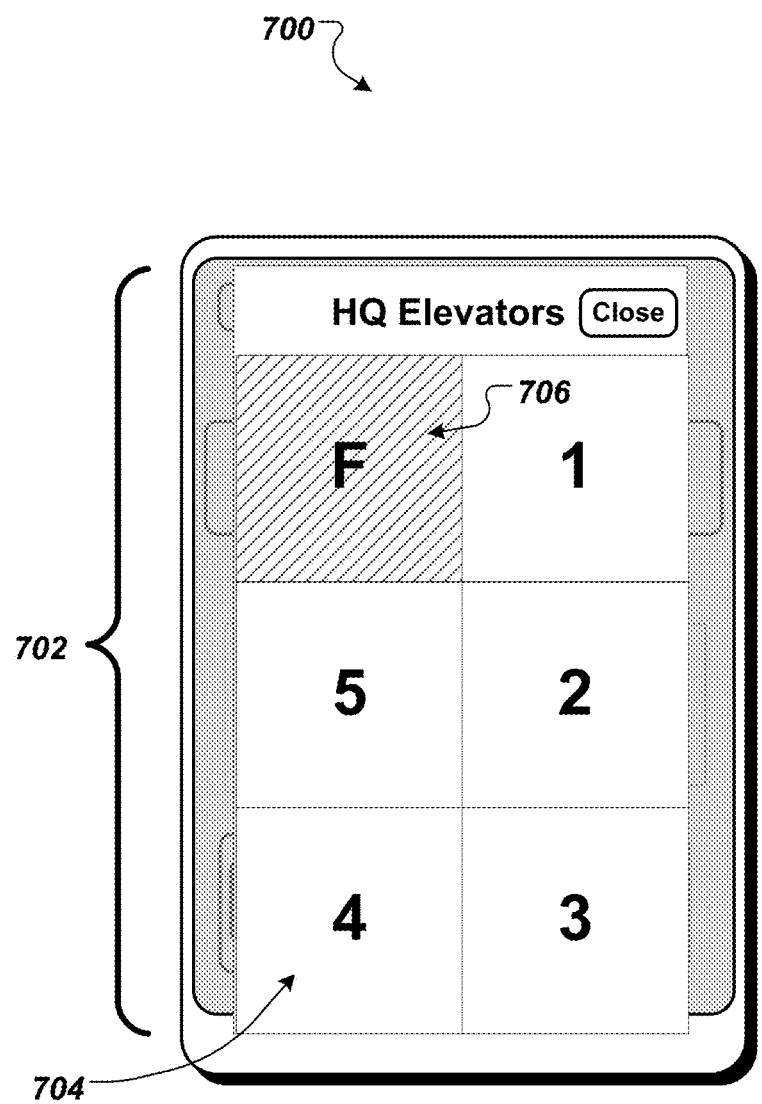

Referring now to FIG. 7, a user interface 700 is illustrated that displays a set of control icons, corresponding to another particular physical orientation of a user, for selecting among a set of keys associated with a group key that has been selected by a user to access a set of physical resources. In this example, the interface 700 displays control icons 702 representing a physical orientation of the 6 elevators 402 in FIG. 4 relative to the second physical orientation 404(2) of the user, at User Position 2 on the north end of the lobby. In order to help the user select the correct key for a desired elevator, such as the key for elevator #4 corresponding to control icon 704, the interface 700 displays the control icons 702 in a manner that reflects the relative locations of the 6 elevators to which the keys correspond. Also in this example, user interface component 706, corresponding to the freight elevator, is indicated as being inaccessible to the user.

FIGS. 6 and 7 have presented just one possible example of control icons, and other types of control icons may be displayed by a credential management application to enable usage of one or more keys based on a physical orientation of the one or more physical resources relative to the determined physical orientation of the mobile device of the user. Furthermore, a control icon may have any suitable functionality, for example, it may cause a particular key to be used to access a physical resource or may cause another interface to be displayed that enables a key to be used.

Continuing with the examples of FIGS. 6 and 7, when elevator #4 arrives and the user boards it to ride to another floor, the user selects the corresponding control icon 604 from interface 600 in FIG. 6 or control icon 704 from interface 700 in FIG. 7 in order to gain access to the floor to which the user desires to ride. If the user is granted access to the desired floor, then the elevator #4 begins to travel to the desired floor and an indication of access being granted is displayed to the user, as illustrated in the user interface 800 of FIG. 8.

Figure 8:
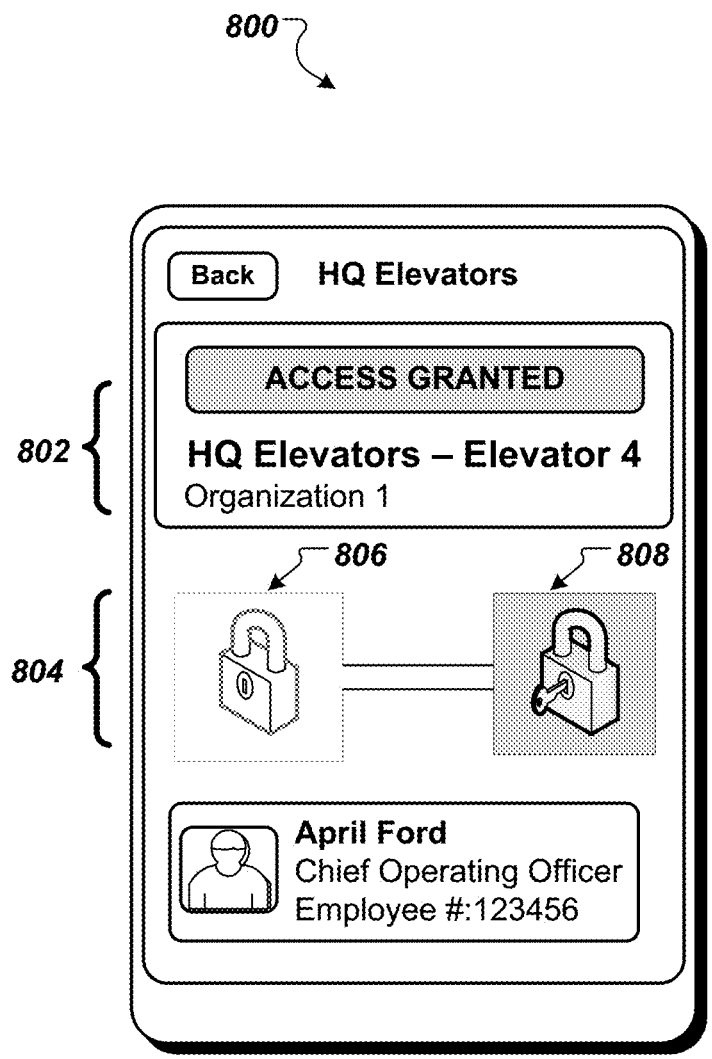

Referring now to FIG. 8, an example user interface 800 is illustrated that displays an indication that a physical resource has been unlocked using a key and is accessible to the user. In this example, a text display 802 may be displayed indicating that Organization 1 has authorized the user to access elevator #4 (e.g., as a result of the user selecting control icon 604 in FIG. 6 or control icon 704 in FIG. 7). The slideable interface component 804 indicates that the key-shaped icon has been moved from the "locked" position 806 to the "unlocked" position 808. Other types of graphical displays may be presented by interface 800 to indicate that access has been provided to a particular physical resource.

As another example of physical resources that are accessible by keys presented by the credential management application, Organization 1 may have a parking garage in which there are 3 different lanes to enter and/or exit the parking garage. The diagram in FIG. 9 illustrates the physical configuration of the entrance/exit lanes in the Organization 1 parking garage.

Figure 9:
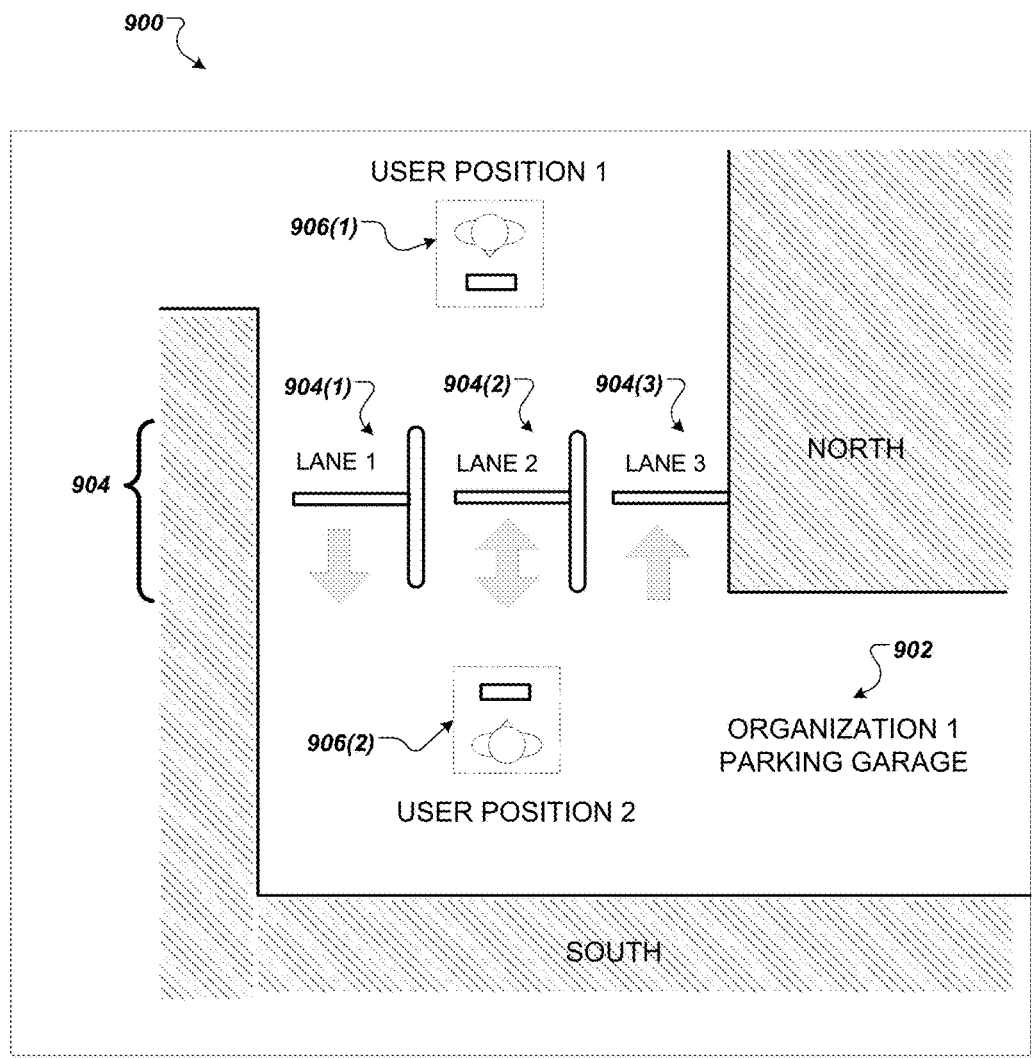

Referring now to FIG. 9, a diagram of an example physical configuration 900 is illustrated that shows physical resources that are accessible by one or more keys. In this example, Organization 1 has a parking garage 902 with a set of lanes 904 that includes 3 different lanes, labeled by 904(1), 904(2), and 904(3). The first lane 904(1) may be configured to always be an entrance lane, and the third lane 904(3) may be configured to always be an exit lane. The second lane 904(2), meanwhile, may be configured to alternate between being an entrance lane and an exit lane. For example, during the morning, the second lane 904(2) may operate as an entrance lane and during the evening, the second lane 904(2) may operate as an exit lane.

The example also illustrates two possible physical orientations of a mobile device of a user. A first physical orientation 906(1) corresponds to the mobile device of the user facing south. The second physical orientation 906(2) corresponds to the mobile device of the user facing north. In addition to two different physical orientations of the mobile device of a user, this example also illustrates two different geographic locations of the user, User Position 1 (corresponding to physical orientation 906(1)) located at the north side of the garage entrance, and User Position 2 (corresponding to physical orientation 906(2)) located at the south side of the garage entrance.

The 3 lanes may be accessible by the user selecting a single group key (e.g., by selecting the interface component 306 in FIG. 3). When the user selects a particular group key, the credential management application may determine whether the user is authorized to access at least one of the physical resources represented by the group key. Additionally or alternatively, in some implementations, this determination of user authorization to access the physical resources represented by the group key may be performed at other suitable times, such as when the application displays the group key to the user (e.g., in interface 300 of FIG. 3) or later when the user attempts to access a particular physical resource from among the group of physical resources (e.g., as described below in relation to FIG. 13).

Figure 10:
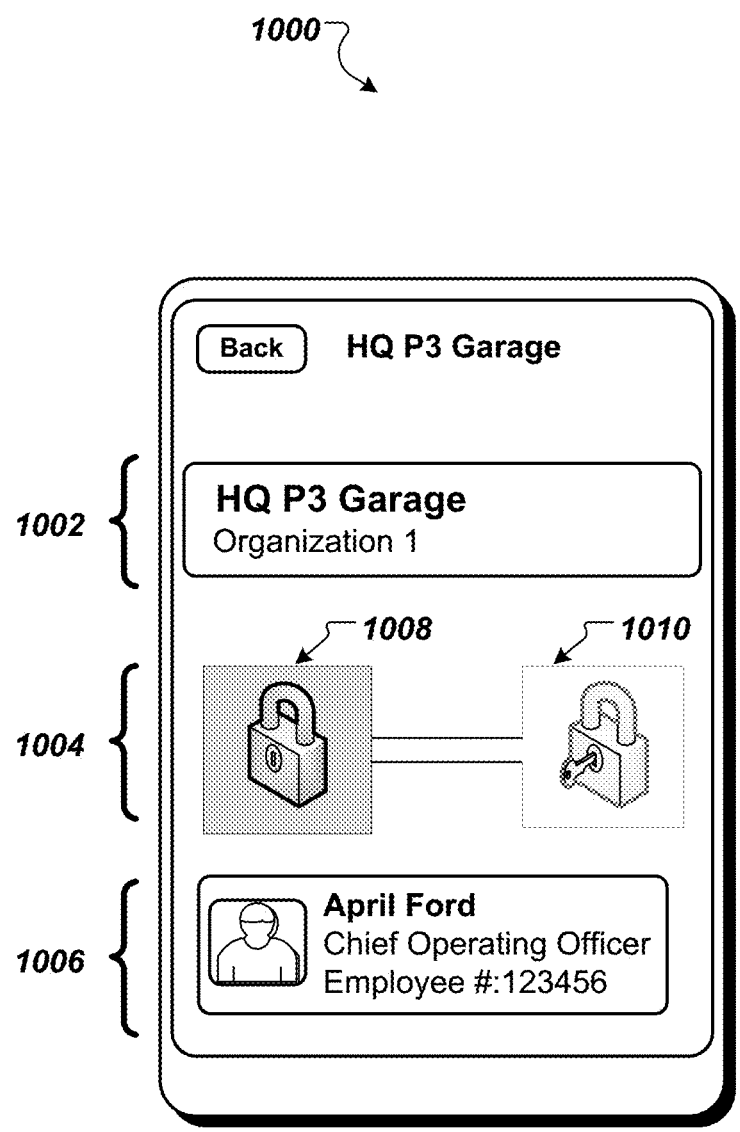

Referring now to FIG. 10, an example user interface 1000 is illustrated that displays information about a selected group key. In this example, the group key is associated with the lanes 904 in the parking garage of Organization 1 illustrated in FIG. 9. The user interface 1000 includes a text display 1002 that describes the group key and a slideable interface component 1004 that enables the user to use the group key to access the group of physical resources (e.g., the parking garage lanes 904 in FIG. 9). The interface 1000 also may display information about the user in text display area 1006. In this example, the user may use the group key to access the group of physical resources (e.g., the parking garage lanes 904 in FIG. 9) by sliding the key-shaped icon in the slideable interface component 1004 from a "locked" position 1008 to an "unlocked" position 1010. Other types of interface options may be presented by interface 1000 for providing access to the group of physical resources using the group key. In this example, when the user operates the slideable interface component 1004 to slide the key-shaped icon to the unlocked position 1010, a menu for the 3 parking garage lane keys may be displayed to the user so that the user can select the appropriate key to use when the user knows which parking garage lane he/she will be using, as illustrated in the interface 1100 illustrated in FIG. 11.

Figure 11:
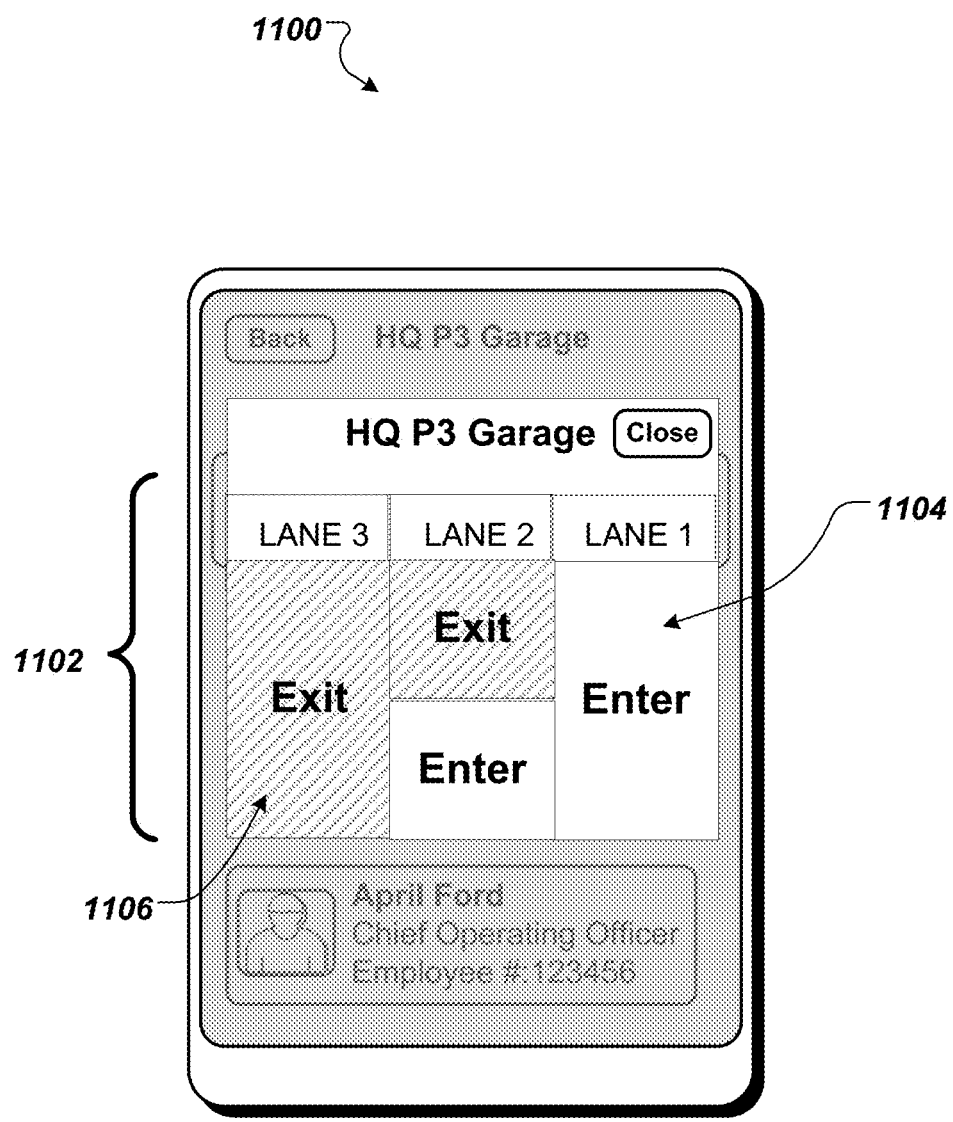

Referring now to FIG. 11, a user interface 1100 is illustrated that displays a set of control icons, corresponding to a particular physical orientation of a user, for selecting among a set of keys associated with a group key that has been selected by a user to access a set of physical resources. In this example, the interface 1100 displays control icons 1102 representing a physical orientation of the 3 parking garage lanes 904 in FIG. 9 relative to the first physical orientation 906(1) of the user, at User Position 1 on the north side of the parking garage. As illustrated in the user interface 1100 of FIG. 11, in order to help the user select the correct key for a desired lane, such as the key for lane 1 corresponding to control icon 1104, the interface 1100 displays the control icons 1102 in a manner that reflects the relative locations of the 3 lanes to which the keys correspond.

In this example, the display of the icons 1102 is presented in a manner that is consistent with the first physical orientation 906(1) of the user relative to the 3 lanes illustrated in FIG. 9. In contrast, if the application determines that the mobile device of the user is oriented in the second physical orientation 906(2), corresponding to User Position 2 in FIG. 9, then the control icons would be displayed as illustrated in the user interface 1200 of FIG. 12.

In some implementations, the credential management application may block access to keys that are not appropriate for a user (e.g., based on the determined location and/or orientation of the user's mobile device). For example, in FIG. 11, if the determined physical orientation of the user suggests that the user is entering the garage (e.g., in User Position 1, 906(1), in FIG. 9), the user may be blocked from using keys that are associated with exiting the garage (e.g., the key corresponding to control icon 1106 in FIG. 11, which is shaded to indicate that the key is inaccessible).

Figure 12:
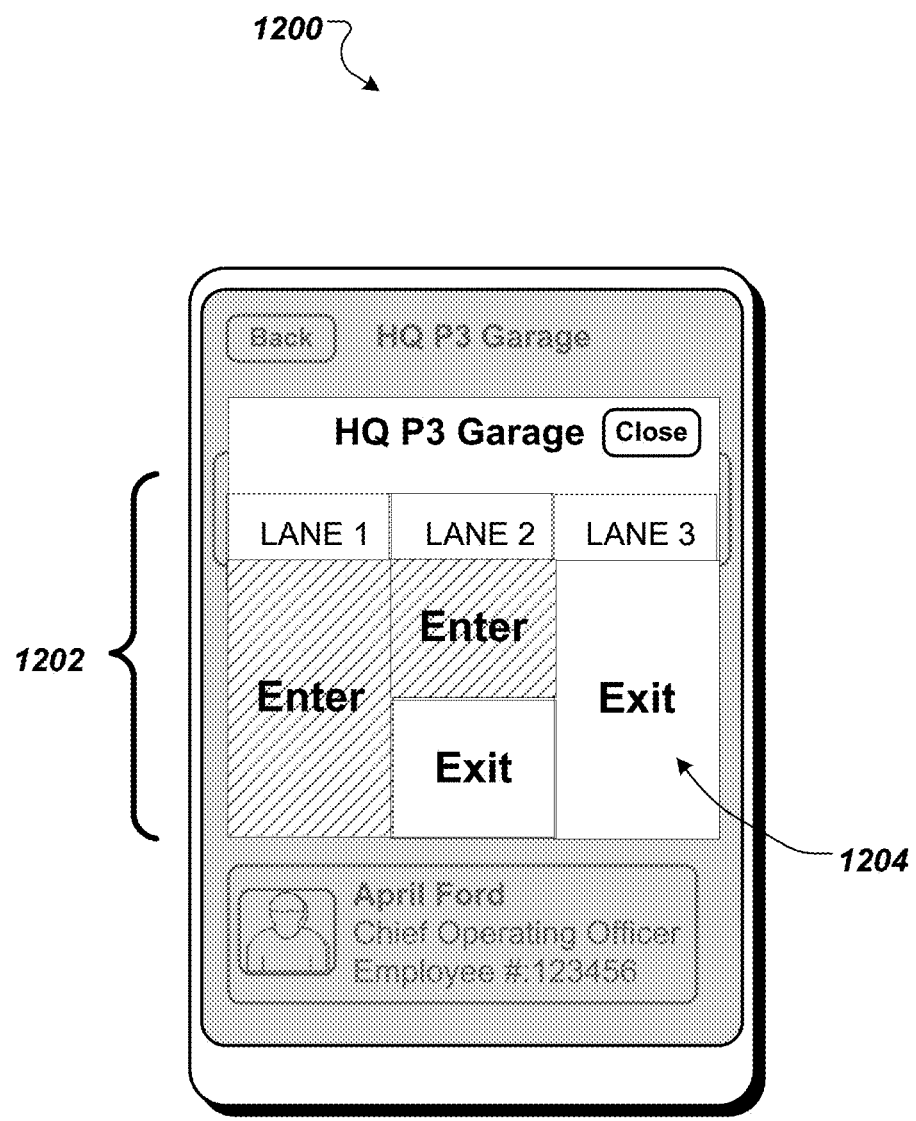

Referring now to FIG. 12, a user interface 1200 is illustrated that displays a set of control icons, corresponding to another particular physical orientation of a user, for selecting among a set of keys associated with a group key that has been selected by a user to access a set of physical resources. In this example, the interface 1200 displays control icons 1202 representing a physical orientation of the 3 parking garage lanes 904 in FIG. 9 relative to the second physical orientation 906(2) of the user, at User Position 2 on the south side of the parking garage. In order to help the user select the correct key for a desired lane, such as the key for lane 3 corresponding to control icon 1204, the interface 1200 displays the control icons 1202 in a manner that reflects the locations of the 3 lanes to which the keys correspond.

FIGS. 11 and 12 have presented just one possible example of control icons, and other types of control icons may be displayed by a credential management application to enable usage of one or more keys based on a physical orientation of the one or more physical resources relative to the determined physical orientation of the mobile device of the user. Furthermore, a control icon may have any suitable functionality, for example, it may cause a particular key to be used to access a physical resource or may cause another interface to be displayed that enables a key to be used.

Continuing with the examples of FIGS. 11 and 12, when the user enters lane 1 to enter the garage in FIG. 11 or when the user enters lane 3 to exit the garage in FIG. 12, the user selects the corresponding control icon 1104 from interface 1100 in FIG. 11 or control icon 1204 from interface 1200 in FIG. 12 in order to enter or exit the parking garage. If the user is granted access to enter the parking garage (e.g., based on authorization of the user's credential) or exit the parking garage (e.g., based on authorization of the user's credential), then an access gate for the selected lane opens and an indication of access being granted is displayed to the user, as illustrated in the user interface 1300 of FIG. 13.

Figure 13:
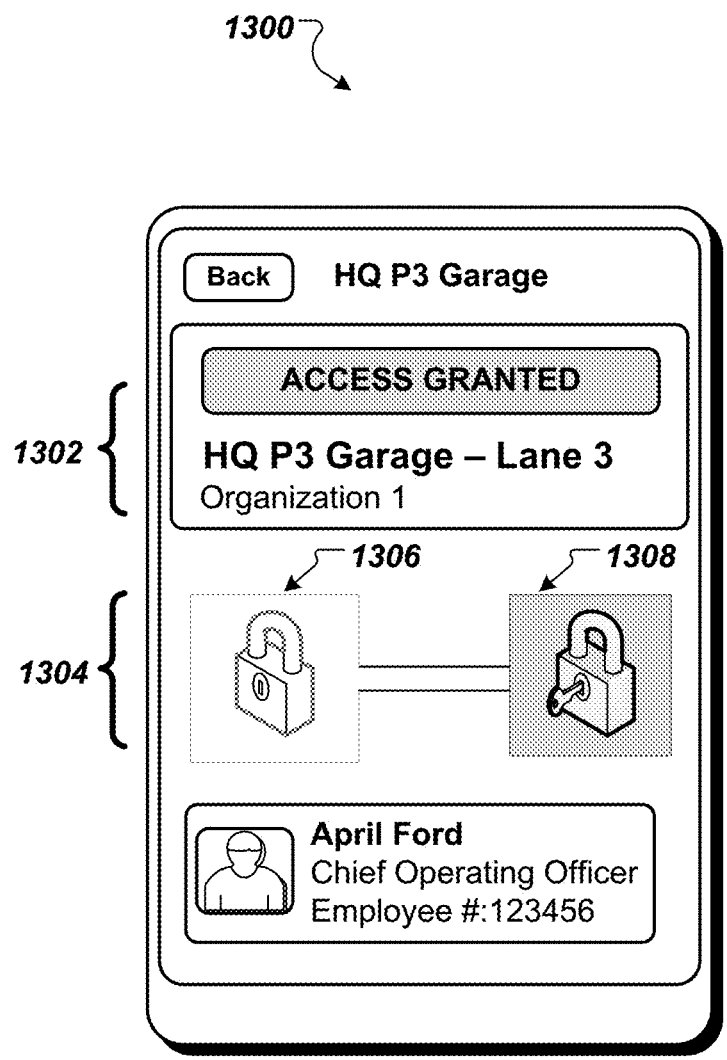

Referring now to FIG. 13, an example user interface 1300 is illustrated that displays an indication that a physical resource has been unlocked using a key and is accessible to the user. In this example, a text display 1302 may be displayed indicating that Organization 1 has authorized the user to access a parking garage lane (e.g., as a result of the user selecting control icon 1204 in FIG. 12 to exit the garage using lane 3). The slideable interface component 1304 indicates that the key-shaped icon has been moved from the "locked" position 1306 to the "unlocked" position 1308. Other types of graphical displays may be presented by interface 1300 to indicate that access has been provided to a particular physical resource.

The access of a physical resource using a key can be enabled by any suitable technique. In some implementations, user invocation of a key may send an indication to a server system of the invoked key and the user that invoked the key. The server system may determine if the user is authorized to access the key and, if so, may communicate with an access control system to enable the user access to the physical resource associated with the key (e.g., by causing a door or other mechanism to be opened and/or unlocked, etc.). In some implementations, the user's mobile device may determine that the user is authorized to access the key and may communicate directly with the access control system to enable the user access to the physical resource associated with the key.

For example, a user's mobile device may use short-range wireless communication signals, such as infrared (e.g., Bluetooth) or near-field communication (e.g., NFC) signals to access a physical resource by placing the mobile phone in close proximity to the physical resource. As another example, the mobile device may access a physical resource indirectly via an intermediate device, such as a relay or a router. Additionally or alternatively, the mobile device may use a wireless network communication signal (e.g., Wi-Fi, cellular, etc.), to access a physical resource over a communication network. For example, the mobile device may send control signals to the credential-issuing organization via wireless communication (either directly or via the server system), which may then, in turn, control the physical resource. In some implementations, the mobile device may use an attached device, such as a dongle, to facilitate access of the physical resource. These are merely some examples of techniques that can be used by a mobile device to access a physical resource as a result of a user of the mobile device attempting to use a key to access the physical resource, and other techniques may be used.

Figure 14:
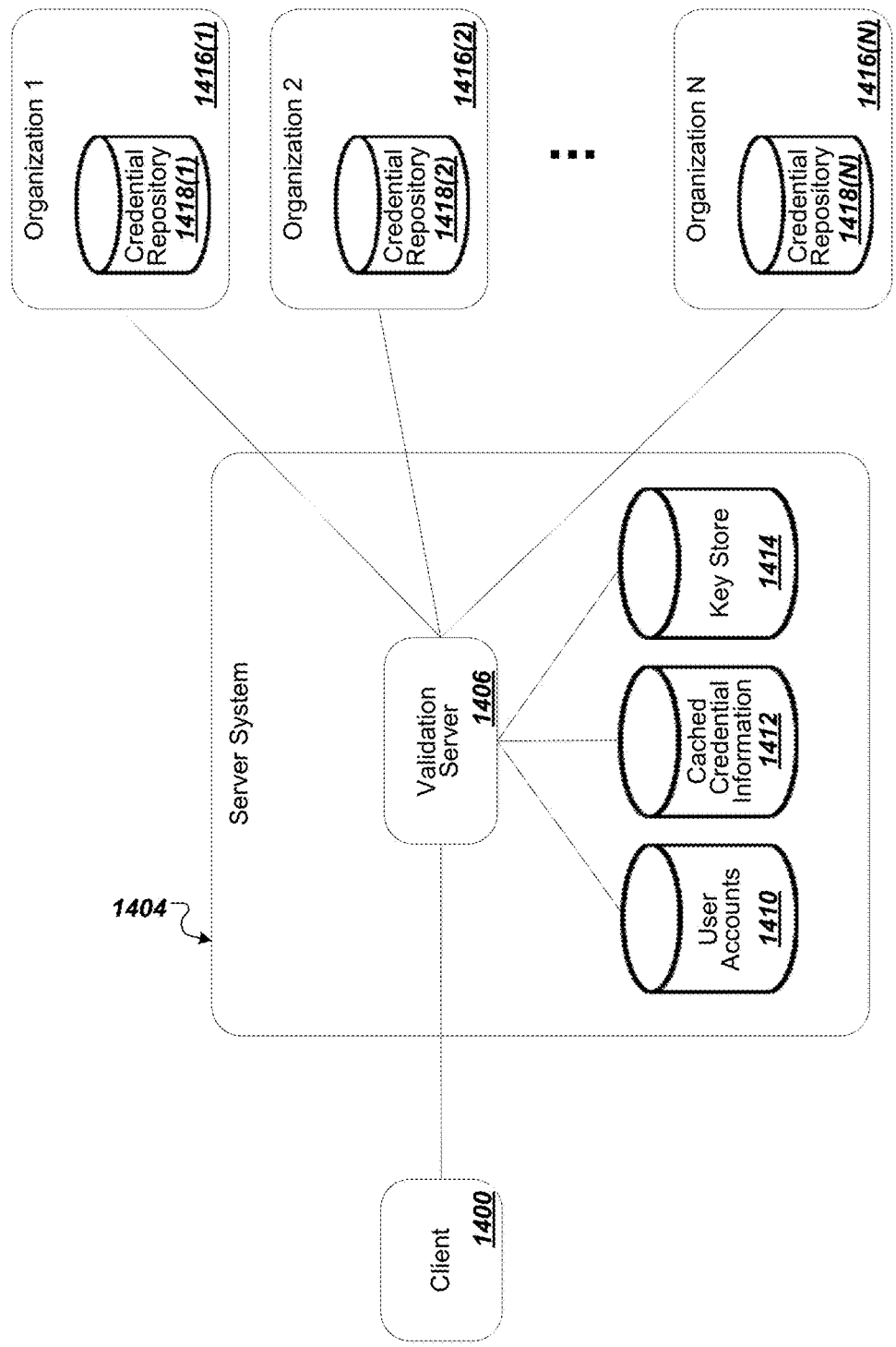
FIG. 14 is a diagram illustrating an example of a credential management system.

Referring now to FIG. 14, an example credential management system is illustrated. In this example, the system includes a client device 1400, and a server system 1404. The client device 1400 operates a mobile device-based credential management application. The client device 1400 may include any electronic device that is capable of communicating with the server system 1404 including, but not limited to, a mobile phone, smart phone, personal digital assistant (PDA), electronic book (e-book) reader, tablet computer, laptop, or other device that includes one or more processors and non-transitory computer readable storage media. The credential management application that is installed on the client device 1400 is in communication with the server system 1404. The credential management application acts as a platform for managing credentials and keys issued to multiple, different users by various credential-issuing organizations.

The server system 1404 includes a validation server 1406, a user account data store 1410, a credential data store 1412, and a key data store 1414. The validation server 1406 is involved in the process of validating credential issuing organizations as well as the validation of credentials and/or keys. The validation server 1406 authenticates credential issuing organizations that would like to make credentials and/or keys available to users of the credential management application. The validation server 1406 also validates credentials and/or keys held by users of the credential management system through communication with credential management applications operated on user devices, such as client device 1400. The validation server 1406 may also provide further functionality of managing, validating, and presenting keys that have been issued by credential-issuing organizations. For example, in some implementations, the validation server 1406 may determine a display arrangement of one or more control icons that enable usage of one or more keys based on a physical orientation of one or more physical resources relative to a determined physical orientation of the mobile device of the user, as well as other functions associated with management and provisioning of keys. In some implementations, functions related to the presentation of keys to a user's device (e.g., determining a display arrangement of the control icons) may be performed by a user's mobile device (e.g., client device 1400) executing a credential management application, and the validation server 1406 may perform other functions related to management of keys, such as validating the user's access to keys, or authorizing a user's access to keys.

The user account data store 1410 stores user account information, the credential data store 1412 stores credential information associated with user accounts, and the key data store 1414 stores keys associated with the credentials. Users of the credential management application may set up user accounts that allow the users to store personal information as well as the credentials and keys that have been issued to the users. Each user account may include identification information for the user and credential/key data that defines credentials and/or keys held by the user. The server system 1404 may maintain accounts for multiple different users with each user account specific to a user as well as maintain the credentials and/or keys held by the specific user.

The validation server 1406 may be in communication with the user account data store 1410, the credential data store 1412, and the key data store 1414, for example, to manage and validate credentials and keys. The validation server 1406 authenticates and establishes connections with various trusted credential-issuing organizations, such as Organization 1, Organization 2, . . . , Organization N that operate systems 1416(1), 1416(2), . . . , 1416(N), respectively, as shown in FIG. 14. The number of credential-issuing organizations N can be any suitable positive integer. The server system 1404 may use a variety of information and techniques to communicate with the credential issuing organization systems 1416(1)-1416(N). For instance, the server system 1404 may use an electronic address (e.g., a uniform resource locator (URL)) to communicate with the credential-issuing organization systems 1416(1)-1416(N) and a set of guidelines that govern a format for exchanging communications between the credential issuing organization systems 1416(1)-1416 (N) and the server system 1404.

As shown in FIG. 14, the validation server 1406 establishes multiple, different connections with multiple, different credential-issuing organization systems 1416(1)-1416(N). The credential-issuing organizations may include one or more universities, one or more companies, and one or more government agencies, among other credential-issuing organizations. One or more of the credential issuing organization systems 1416(1)-1416(N) may maintain a credential repository (e.g., credential repositories 1418(1)-1418 (N)) on systems 1416(1)-1416 (N).

For example, the client device 1400 may attempt to use a credential and/or key from the credential issuing organization system 1416(1), operated by Organization 1. The validation server 1406 sends a request to the credential-issuing organization system 1416(1) for credential information of a user of the client device 1400. The credential-issuing organization system 1416(1) accesses data from the credential repository 1418(1) and provides credential information from the accessed data to the validation server 1406. In some implementations, a credential-issuing organization 1416(1) may transmit the credential information to the server system 1404 in a specific format specified by the server system 1404. For example, the credential-issuing organization system 1416(1) may transmit the credential information to the server system 1404 as a JavaScript Object Notation (JSON) object. Additionally or alternatively, the credential information may have certain fields to be filled by the credential issuing organization system 1416(1) as specified by the server system 1404. The fields may include group name, user name, title of credential or badge title, expiration date, cache until date, and an extra field. The credential information also may include additional information. Such additional information may be communicated as encryption key-value pairs or it may be communicated as binary data or any other suitable data format. Additional information may include a photo of the user or the logo of the credential-issuing organization.

After receiving the credential information from the credential-issuing organization system 1416(1), the server system 1404 may add one or more credentials and/or keys to the user's account based on the received credential information. For example, the server system 1404 may identify an account associated with the user and associate, with the account, one or more credentials and/or keys defined by the credential information. In this example, the server system 1404 may store the credential information in association with the account of the user or the server system 1404 may store other information representing the one or more credentials or keys defined by the credential information.

In some examples, after a credential and/or key is added to a user's account, the server system 1404 may sign the added credential and/or key and pass the added credential and/or key to the user's client device 1400, where the added credential and/or key is displayed by the mobile credential management application with the list of credentials and/or keys associated with the account of the user. In these examples, some or all of the credential information for each of the credentials and/or keys associated with the account of the user is stored at the client device by the mobile credential management application. Accordingly, the mobile credential management application is able to display the list of credentials and/or keys without communicating with the server system.

In some implementations, credential information is not stored at the client device and the user may be required to retrieve credentials and/or keys from the credential-issuing organization each time the user selects to view a list of credentials and/or keys. In these implementations, the user may be required to go through the entire authentication process each time the user selects to view the list of his/her credentials and/or keys.

In some examples, the server system 1404 may store cached versions of the credentials and/or keys and may retrieve credentials and/or keys from storage (e.g., from the cached credential store 1412 or from the cached key store 1414) to display when the user selects to view a list of credentials and/or keys at the mobile credential management application. In these examples, the mobile credential management application communicates with the server system 1404 to display the list of credentials and/or keys, but the user is not required to go through the entire authentication process to view the list of his/her credentials and/or keys. Where a cached version of a credential and/or key is stored by the server system 1404, the server system 1404 may periodically request updated versions of the credential and/or key from the credential-issuing organization to ensure that the version of the credential and/or key displayed by the user is the most current version and that the credential and/or key has not been revoked by the credential-issuing organization.

Credentials and/or keys issued to a user by a credential-issuing organization may be cached (e.g., in the cached credential data store 1412 or in the cached key data store 1414) for a specified period of time (e.g., until a cache-until-date associated with the credential and/or key). The cache-until-date, for example, defines a date until which a cached version of the credential and/or key may be provided to the user without the server system having to communicate with the credential-issuing organization to confirm the continued validity of the credential and/or key. When the cache-until-date has not passed, the server system 1404 may access, from electronic storage at the server system 1404, a cached version of the credential and/or key and use the cached version of the credential and/or key to send the credentials and/or keys (e.g., send a user an updated list of the user's credentials and/or keys) or validate the credential and/or key (e.g., confirm to another user that the user's credential and/or key is valid). When the cache-until-date has passed, the server system 1404 communicates with the credential-issuing organization that issued the credential and/or key to receive updated credentials and/or keys. For example, an employer may define a cache-until-date corresponding to twenty-four hours from the time of issuance for an employee key issued to an employee by the employer. In this example, if the server system 1404 has received information for the employee key from the employer's system less than twenty-four hours prior to the employee's attempted use of the key (e.g., using the key to gain access to the employer's building), the server system 1404 may validate the use of the employee key without having to communicate with the employer's system. If not, the server system 1404 communicates with the employer's system to receive updated information for the employee key and validates the use of the employee key based on the updated information for the employee key.

Credentials and/or keys also may be associated with an expiration date. When a credential and/or key is associated with an expiration date, the credential and/or key may be stored by the server system 1404 until the expiration date. For instance, when the server system 1404 determines that the expiration date of a credential and/or key has passed, the server system 1404 may delete the data defining the expired credential and/or key and remove the expired credential and/or key from the user's account.

The server system 1404 may, in some implementations, refresh one or more credentials and/or keys for a user. The server system 1404 may refresh a credential and/or key for any appropriate reasons, such as in an effort to have an up-to-date version of the credential and/or key available to the client device through the credential management application. Refreshing a credential and/or key may include sending updated credential information to the client device 1400, which the client device 1400 may display and/or store. Refreshing one or more credentials and/or keys may occur based on actions taken by the user through the credential management application, such as providing input to display a current version of a particular credential and/or key or a current version of a list of credentials and/or keys held by the user. Credentials and/or keys stored on the client device 1400 also may be periodically refreshed (e.g., daily, weekly, monthly, etc.) by the server system 1404 so that the credential information stored on the client device 1400 is reasonably up-to-date.

There may be various different triggers that cause the server system 1404 to determine to refresh one or more credentials and/or keys. In some implementations, the system 1404 may determine to refresh a credential and/or key based on a cache-until-date associated with the credential and/or key expiring. For example, an employee key may have a cache-until-date of one week. At the end of the week, the system 1404 may determine to refresh the key to determine if a newer version of the key is available. Additionally or alternatively, the system 1404 periodically may determine to refresh a credential and/or key to ensure that the credential and/or key still is valid and has not been revoked by the credential-issuing organization that issued the credential and/or key. The system 1404 also may determine to refresh a credential and/or key in response to receiving a request to access the credential and/or key from the user to whom the credential and/or key was issued and/or in response to a request to validate the credential and/or key.

A user may add credentials and/or keys issued to the user by more than one credential-issuing organization to his/her user account. For example, the user may wish to add a degree from a University, as well as an employee badge from his/her place of employment. In this example, the multiple credentials may be added in multiple, separate requests to add the credentials. In some implementations, a credential-issuing organization may provide several types of credentials and/or keys to a user such that the user's account includes multiple, different credentials and/or keys issued by the credential-issuing organization to the user. Additionally or alternatively, a user may receive credentials and/or keys from several different credential-issuing organizations such that the user's account includes at least a first credential and/or key issued by a first organization and a second credential and/or key issued by a second organization. The credential management system may maintain accounts for many different users and may manage credentials and/or keys issued to these users by many different organizations.

Figure 15:
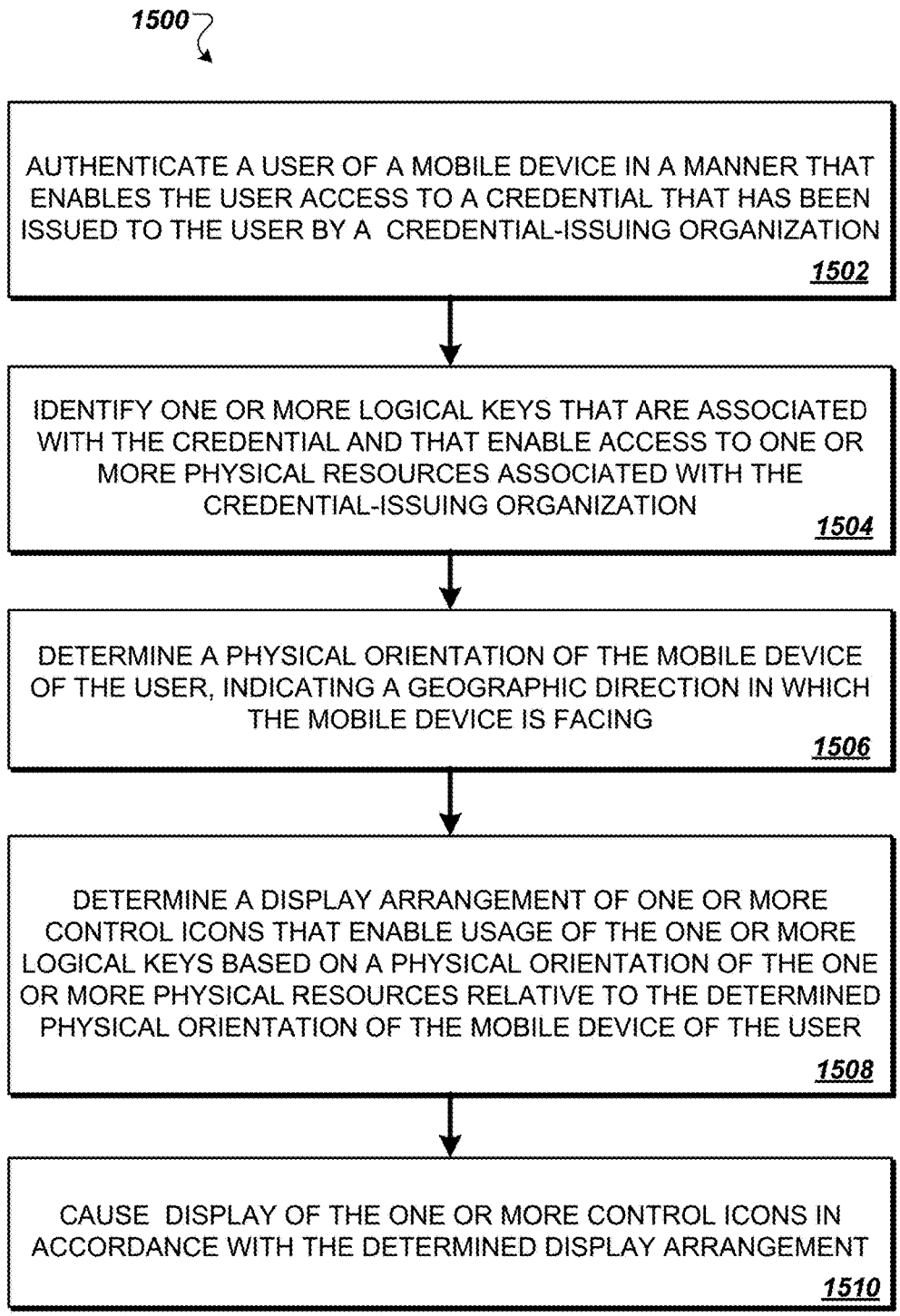
FIGS. 15-19 are flowcharts illustrating example processes for managing use of credentials and related resources, such as keys.
Figure 16:
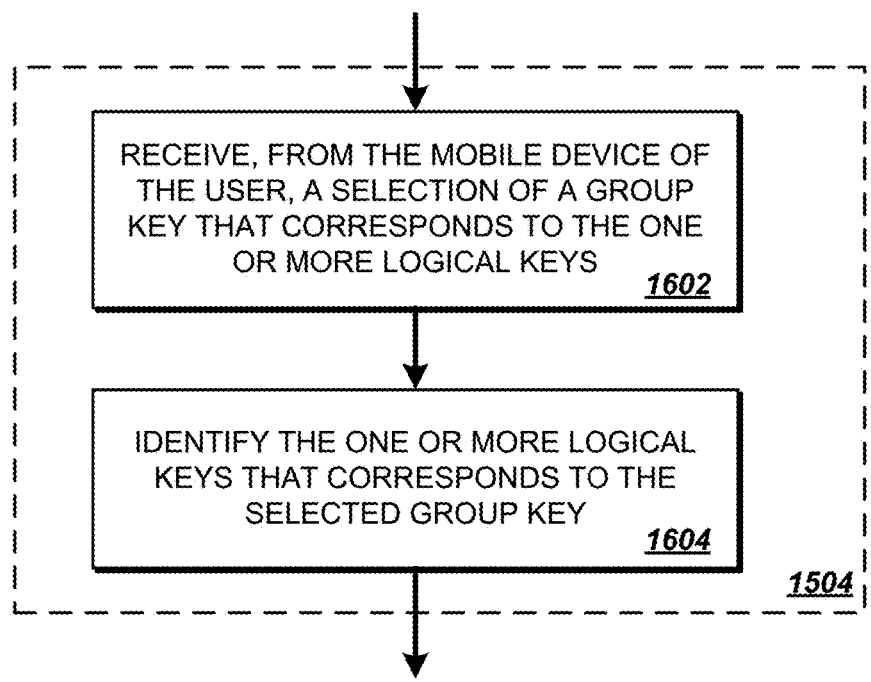
Figure 17:
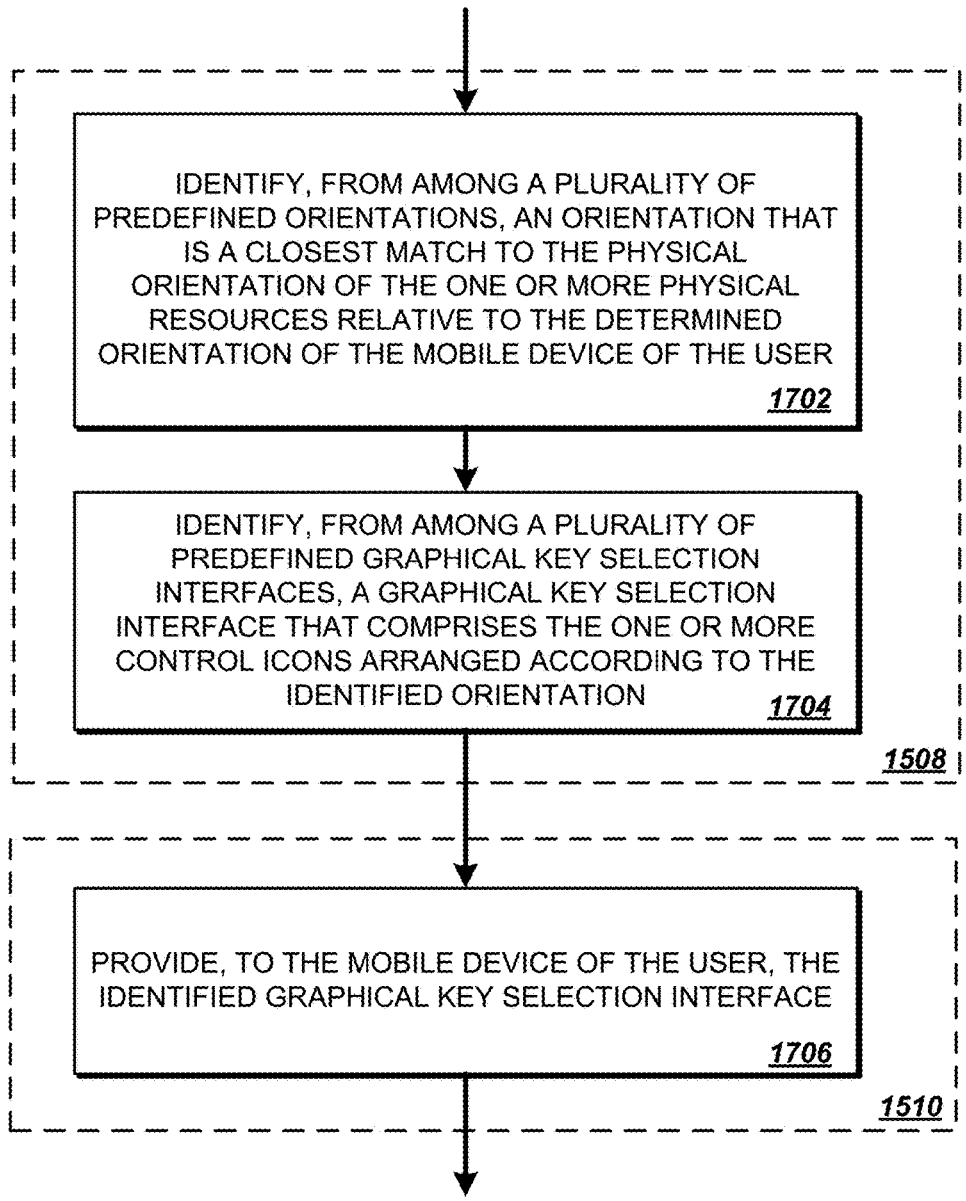

Referring now to FIGS. 15-17, various example processes are illustrated for managing the use of keys. In these examples, the processes are described as being executed by a server system (e.g., the server system 1404 in FIG. 14) that hosts a mobile-based credential management application. Though, in some implementations, some or all of the operations illustrated in FIGS. 15-17 may additionally or alternatively be performed by a user's mobile device that executes the mobile-based credential management application.

Referring now to FIG. 15, an example process 1500 is illustrated for managing the use of keys. The process 1500 may be executed using client-side and/or server-side processing. In this example, the operations of the process 1500 are described generally as being performed by a server system, such as the server system 1404 in FIG. 14. However, in some implementations, some or all of the steps in process 1500 may be performed by a user's mobile device (e.g., client device 1400 in FIG. 14) executing a mobile-based credential management application that is hosted by a server system (e.g., server system 1404 in FIG. 14). The operations of the process 1500 may be performed by one of the components of the system 1404 (e.g., the validation server 1406) or may be performed by a combination of the components of the system 1404. In some implementations, operations of the process 1500 may be performed by one or more processors included in one or more electronic devices.

In this example, the server system 1404 authenticates a user of a mobile device (e.g., client device 1400 in FIG. 14) in a manner that enables the user access to a credential that has been issued to the user by a credential-issuing organization (e.g., credential-issuing organization system 1416(1)) (1502). The server system 1404 identifies one or more keys that are associated with the credential and that enable access to one or more physical resources associated with the credential-issuing organization (1504). The server system 1404 then determines a physical orientation of the mobile device of the user, indicating a geographic direction in which the mobile device is facing (1506). The physical orientation of the mobile device may be determined using any suitable technique, some examples of which are described below.

In some implementations, when the server system 1404 identifies the keys (e.g., in 1504 of FIG. 15) and determines the display arrangement of the control icons (e.g., in 1508 of FIG. 15), it may distinguish between keys that are accessible to the user and keys that are not accessible to the user based on the authorizations granted by the credential-issuing organization that issued the keys. For example, the server system 1404 may identify a subset of the one or more keys that is accessible to the user. The server system 1404 may then determine a subset of the one or more control icons that corresponds to the identified subset of the one or more keys. When the server system 1404 causes display of the one or more control icons (e.g., in 1510 of FIG. 15), it may indicate the accessibility of only the subset of the one or more control icons that corresponds to the identified subset of the one or more keys.

The server system 1404 determines a display arrangement of one or more control icons that enable usage of the one or more keys based on a physical orientation of the one or more physical resources relative to the determined physical orientation of the mobile device of the user (1508), and causes display of the one or more control icons in accordance with the determined display arrangement (1510). In some implementations, the mobile device may use a mapping feature (e.g., using a phone's mapping software) to display the one or more control icons in a graphical map-based interface that illustrates the location and/or orientation of the physical resources.

The process 1500 may be executed entirely by a user's mobile device executing a mobile-based credential-management application, or may be executed entirely by a server system that hosts the mobile-based credential management application, or may be executed by any combination of user-side and server-side processing (e.g., the client device 1400 could execute the user authentication and key management in 1502 and 1504, while the server system 1404 could execute the orientation determination and display in 1506-1510).

A server system (e.g., the server system 1404 in FIG. 14) and/or a user's mobile device (e.g., client device 1400 in FIG. 14) may use any technique to determine a physical orientation of the user and/or the mobile device of the user. In some implementations, geographic directional information may be generated by a geographic direction sensing device of the mobile device of the user. For example, the geographic direction sensing device may include a compass, a gyroscope, an accelerometer, or a proximity sensor of the mobile device of the user. In scenarios in which a server system determines the physical orientation of the user's mobile device, the server system may receive geographic direction information from the mobile device of the user and determine that the geographic direction in which the mobile device of the user is facing corresponds to the geographic direction detected by the geographic direction sensing device of the mobile device.

In addition or as an alternative to determining the physical orientation of the mobile device of a user, the mobile-based credential management application may determine a physical orientation of the user. For example, the physical orientation of the user may be determined with respect to the user's mobile device, and may be combined with information about the physical orientation of the user's mobile device to facilitate displaying control icons representing one or more physical resources. A server system and/or a user's mobile device may use any technique to determine the physical orientation of the user. For example, the server system 1404 may receive one or more photographed images captured by one or more image sensors. The image sensors may include, for example, a camera on the user's mobile device or a camera that is separate from the user's mobile device (e.g., a security camera located near the physical resources that the user is attempting to access). The server system 1404 may process the photographed image(s) and determine, based on processing the photographed image(s), the geographic direction in which the user and/or the user's mobile device is facing.

For example, the server system 1404 may receive a photographed image captured by a camera in the user's mobile device and may process the image to perform pattern recognition to detect recognizable features of the physical resources or other landmarks (e.g., elevator doors, a main entrance, lights, etc.) in the geographic region around the mobile device of the user. The server system 1404 may then use the known physical orientation of the physical resources to determine a physical orientation of the mobile device of the user that is indicated by the captured image. As another example, the server system 1404 may use a photographic image captured by a camera separate from the mobile device of the user (e.g., a security camera), along with potentially other information (e.g., geographic location information) to determine a physical orientation of the mobile device of the user.

Additionally or alternatively, a camera may capture a photographed image primarily of the user, and the server system and/or the user's mobile device may perform image processing techniques to recognize the orientation of the user within the image. Then, based on the determined orientation of the user in the image, the server system and/or the user's mobile device can determine the orientation of the user with respect to the user's mobile device.

Referring now to FIG. 16, an example process is illustrated that shows examples of identifying one or more keys that are associated with the credential and that enable access to one or more physical resources associated with the credential-issuing organization (e.g., in 1504 of FIG. 15). In this example, the server system 1404 receives, from the mobile device of the user, a selection of a group key (e.g., group key 304 or group key 306 in FIG. 3) that corresponds to the one or more keys (1602). The server system 1404 then identifies the one or more keys that correspond to the selected group key (1604).

Referring now to FIG. 17, an example process is illustrated that shows further examples of determining a display arrangement of one or more control icons that enable usage of the one or more keys based on a physical orientation of the one or more physical resources relative to the determined physical orientation of the mobile device of the user (e.g., 1508 in FIG. 15). In this example, the server system 1404 identifies, from among a plurality of predefined orientations, an orientation that is a closest match to the physical orientation of the one or more physical resources relative to the determined physical orientation of the mobile device of the user (1702). The server system 1404 may then identify, from among a plurality of predefined graphical key selection interfaces, a graphical key selection interface that comprises the one or more control icons arranged according to the identified orientation (1704), and provide, to the mobile device of the user, the identified graphical key selection interface (1706, as an example of 1510 in FIG. 15).

The server system 1404 can choose from among any number of different predefined orientations of the physical resources. As an example, for the elevators illustrated in FIG. 4, the server system may have stored two predefined orientations and two different graphical key selection interfaces to display to the user, represented by the two different arrangement of control icons in FIGS. 6 and 7, that correspond to the two different user orientations 404(1) and 404(2) in FIG. 4. In some implementations, instead of a fixed number of predefined orientations and graphical key selection interfaces, the server system 1404 may be able to select a graphical key selection interface that is oriented within a continuous range of possible orientations, as described in relation to FIG. 18 below.

Figure 18:
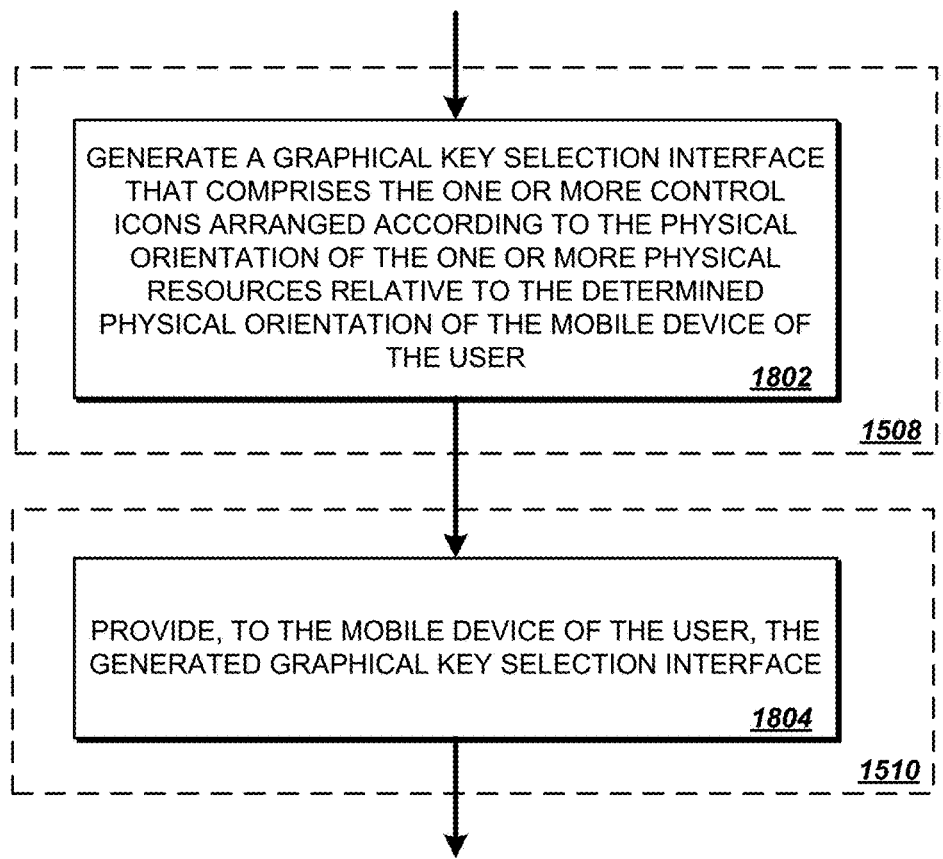

Referring now to FIG. 18, an example process is illustrated that shows further examples of determining a display arrangement of one or more control icons that enable usage of the one or more keys based on a physical orientation of the one or more physical resources relative to the determined physical orientation of the mobile device of the user (e.g., 1508 in FIG. 15). In this example, the server system 1404 generates a graphical key selection interface that comprises the one or more control icons arranged according to the physical orientation of the one or more physical resources relative to the determined physical orientation of the mobile device of the user (1802).

In some implementations, the server system 1404 may present the control icons arranged according to an orientation that is from among a continuous range of orientations for the physical resources. For example, the display of the control icons may be periodically updated by the server system 1404, with any suitable frequency, to track the current physical orientation of the user's mobile device and to display the control icons in a manner that reflects the physical orientation of the physical resources relative to the physical orientation of the user's mobile device. As such, the user may have a more accurate representation of the physical resources from which to select a physical resource.

In this example, the server system 1404 generates a graphical key selection interface that comprises the one or more control icons arranged according to the physical orientation of the one or more physical resources relative to the determined physical orientation of the mobile device of the user (1802). The server system 1404 then provides, to the mobile device of the user, the generated graphical key selection interface (1804, e.g., as an example of 1510 in FIG. 15).

The server system 1404 may use a variety of techniques to determine a display arrangement of the control icons. The user may then select one of the control icons to select a particular physical resource, and the server system 1404 may enable the user to use a particular key to access the physical resource, as described below in relation to FIG. 19.

Figure 19:
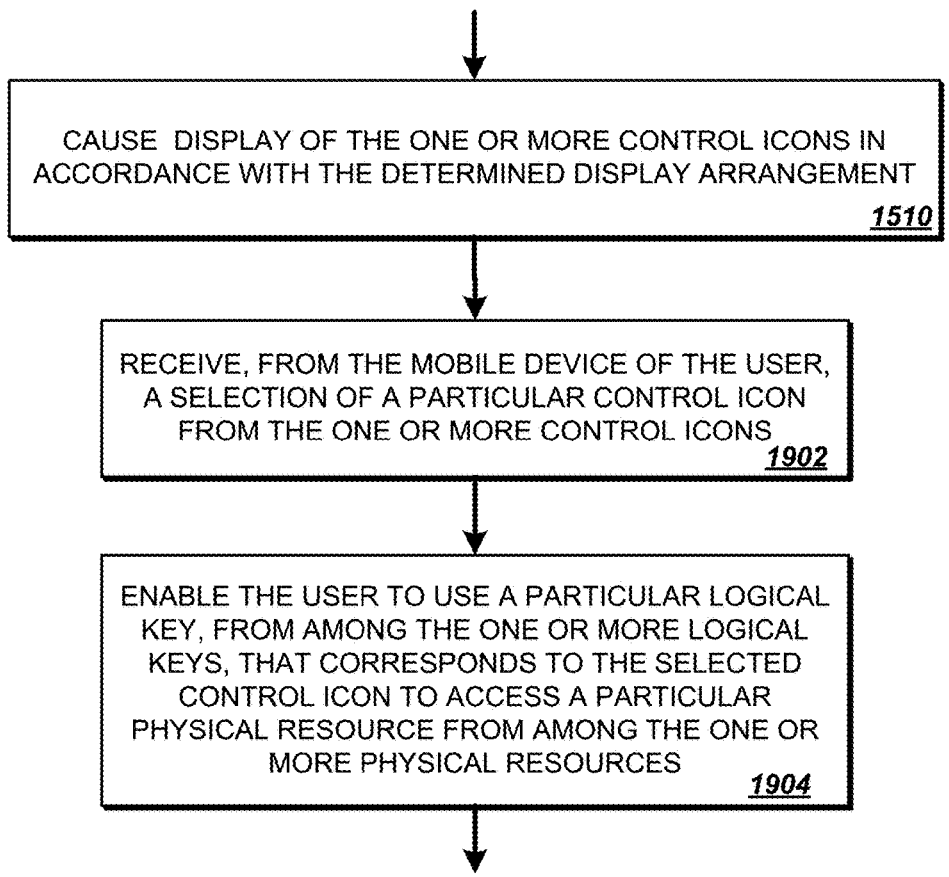

Referring now to FIG. 19, an example process is illustrated that shows receiving a selection of a control icon from a user and enabling the user to use a physical resource that corresponds to the selection. In this example, the server system 1404 receives, from the mobile device of the user, a selection of a particular control icon from the one or more control icons (1902). The server system 1404 then enables the user to use a particular key, from among the one or more keys, that corresponds to the selected control icon to access a particular physical resource from among the one or more physical resources (1904). The server system 1404 may use a variety of techniques to enable the user to use the particular key to access a physical resource. For example, the server system 1404 may send the particular key to the mobile device of the user, or the server system 1404 may communicate with the credential-issuing organization that issued the particular key and indicate that the user should be enabled to access the physical resource corresponding to the particular key. In some implementations, the mobile device of the user may already be in possession of the particular key (e.g., in a local cache on the mobile device) and the user may be able to access the physical resource by using the locally cached key.

In some implementations, the server system 1404 may determine a geographic location of the mobile device of the user. The server system 1404 may use the geographic location of the mobile device of the user for a number of reasons, for example, to assist in determining the physical orientation of the mobile device of the user, or to provide additional services related to the management and presentation of credentials and keys.

In some implementations, the server system may determine a geographic location of the mobile device of the user by receiving an indication of a geographic location from a location-sensing device of the mobile device of the user. For example, the location-sensing device may be a global positioning service (GPS) sensor, or may be a sensor that utilizes cellular location information and/or other wireless communication information. The server system 1404 may send a request to the mobile device of the user to access geographic location from such location-sensing devices.

In some implementations, the server system 1404 may determine a geographic location of the mobile device of the user by processing triangulation information received from a plurality of devices that are in communication with the mobile device of the user. The plurality of devices may be, as examples, wireless base stations, routers, or other devices that are communicative with the mobile device of the user. In some implementations, the plurality of devices may detect strengths of signals received from the mobile device of the user, and transmit indications of the signal strengths to the server system 1404. Based on the signal strengths and the locations of the plurality of devices, the server system 1404 may determine a geographic location of the mobile device of the user.

The server system 1404 may use other techniques to determine the geographic location of the mobile device of the user. For example, the server system 1404 may receive a photographic image that captures a geographic region associated with the physical resources that a user is attempting to access. The server system 1404 may process the photographic image to determine a geographic location of the mobile device of the user.

Geographic location information and/or orientation information of the mobile device of the user may be used in other techniques for provisioning credentials and/or keys to users. For example, in some implementations, the server system may use geographic location information to implement security techniques. For example, the server system may use the location of a user's device to determine whether the user should be enabled to use credentials and/or keys from a credential-issuing organization.

In some implementations, the server system (e.g., server system 1404 in FIG. 14) may determine a geographic location associated with the client device 1400 of the user. The geographic location may be determined by any suitable technique (e.g., by receiving an indication of geographic location from the user's mobile device, or by determining the user's location based on wireless triangulation, or by receiving the user's location from a third party), and at any suitable time.

The server system 1404 further may determine a geographic region associated with the credential-issuing organization. The server system 1404 then may determine whether the user is in proximity to the credential-issuing organization before enabling the user to use a credential and/or key. This may help reduce occurrences of fraud in which unauthorized users attempt to access credentials and/or keys and/or may help reduce occurrences of error in which the user inadvertently attempts to access a credential and/or key for an unintended organization. If the server system 1404 determines a match between the geographic location associated with the mobile device of the user and the geographic region associated with the physical resources of a credential-issuing organization, then the server system proceeds to enable the user to use the credential and/or key.

In some implementations, the location of a user's mobile device may also be used to suggest nearby credential-issuing organizations for which the user may be enabled to use credentials and/or keys. For example, as a user approaches an organization's office building, if the user holds a key for the organization but is not logged-in to the credential management application, then the application may determine that the user is nearing the organization's office building and, consequently, may suggest that the user log-in to the credential management application using the user's authentication information for that organization. As such, the application may reduce the need for a user to search for the appropriate organization, log-in with the organization, and find his or her credentials and/or keys. By using a variety of types of data, such as geo-location data, to manage a variety of credentials and/or keys that were issued by different organizations, the application may facilitate a user's experience in using credentials and keys.

Techniques that use geographic location information to facilitate management and provisioning of credentials and keys may be performed by any suitable component in the server system 1404, for example, by the validation server 1406. The techniques may further involve the server system 1404 communicating information, such as geographic location information, with the credential-issuing organization that issued the credential and/or key.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving information that indicates a location of a mobile device of a user;
identifying one or more physical resources that correspond to the information indicating the location of the mobile device of the user and that are associated with a credential-issuing organization;
identifying one or more keys that are associated with a credential issued to the user by the credential-issuing organization, and that enable the user to access the one or more physical resources associated with the credential-issuing organization;
determining a physical orientation of the mobile device of the user;
determining a display arrangement of one or more control icons that enable usage of the one or more keys based on a physical orientation of the one or more physical resources relative to the determined physical orientation of the mobile device of the user; and
causing display of the one or more control icons in accordance with the determined display arrangement.

2. The method of claim 1,
wherein receiving the information that indicates the location of the mobile device of the user comprises: receiving geo-location information for the mobile device of the user, and
wherein identifying the one or more physical resources that correspond to the information indicating the location of the mobile device of the user and that are associated with the credential-issuing organization comprises: identifying one or more physical resources associated with the credential-issuing organization that correspond to the geo-location of the mobile device of the user.

3. The method of claim 2, wherein identifying the one or more physical resources associated with the credential-issuing organization that correspond to the geo-location of the mobile device of the user comprises:
comparing the geo-location of the mobile device of the user with a geographic region associated with the one or more physical resources; and
determining a match between the geo-location of the mobile device of the user and the geographic region associated with the one or more physical resources.

4. The method of claim 2, further comprising:
determining one or more credential-issuing organizations having associated physical resources that are in a vicinity of the geo-location of the mobile device of the user; and
providing, to the mobile device of the user, information regarding the one or more credential-issuing organizations and the associated physical resources that are in the vicinity of the geo-location of the mobile device of the user.

5. The method of claim 1,
wherein receiving the information that indicates the location of the mobile device of the user comprises: receiving at least one image captured by the mobile device of the user, and
wherein identifying the one or more physical resources that correspond to the information indicating the location of the mobile device of the user and that are associated with the credential-issuing organization comprises: determining one or more physical resources associated with the credential-issuing organization that are recognized in the at least one image captured by the mobile device of the user.

6. The method of claim 1, wherein identifying one or more keys that are associated with the credential and that enable the user to access one or more physical resources associated with the credential-issuing organization comprises:
receiving, from the mobile device of the user, a selection of a group key that corresponds to the one or more keys; and
identifying the one or more keys that correspond to the selected group key.

7. The method of claim 1, wherein determining the display arrangement of the one or more control icons based on the physical orientation of the one or more physical resources relative to the physical orientation of the mobile device of the user comprises:
determining at least one image captured by the mobile device of the user; and
determining the physical orientation of the one or more physical resources relative to the physical orientation of the mobile device of the user based on the at least one image captured by the mobile device of the user.

8. The method of claim 1, wherein determining the physical orientation of the mobile device of the user comprises:
determining a geographic direction in which the mobile device of the user is facing.

9. The method of claim 8, wherein determining the geographic direction in which the mobile device of the user is facing comprises:
receiving geographic directional information from a geographic direction sensing device of the mobile device of the user.

10. The method of claim 9, wherein receiving the geographic directional information from the geographic direction sensing device of the mobile device of the user comprises:
receiving an indication of a detected geographic direction from at least one of a compass, a gyroscope, an accelerometer, or a proximity sensor of the mobile device of the user; and
determining the geographic direction in which the mobile device of the user is facing as the detected geographic direction.

11. The method of claim 1, wherein determining the physical orientation of the mobile device of the user comprises:
receiving at least one photographed image captured by at least one image sensor;
processing the at least one photographed image; and
determining, based on processing the at least one photographed image, the physical orientation of the mobile device of the user.

12. The method of claim 1, wherein determining the physical orientation of the mobile device of the user comprises:
determining a viewing orientation in which the mobile device of the user is being held and viewed by the user.

13. The method of claim 1, wherein:
identifying the one or more keys comprises identifying a subset of keys that are accessible to the user,
determining the display arrangement of the one or more control icons comprises determining a subset of control icons that corresponds to the identified subset of keys, and
causing display of the one or more control icons in accordance with the determined display arrangement comprises indicating accessibility of only the subset of control icons that corresponds to the identified subset of keys.

14. The method of claim 1, wherein determining the display arrangement of the one or more control icons comprises:
identifying, from among a plurality of predefined orientations, an orientation that is a closest match to the physical orientation of the one or more physical resources relative to the physical orientation of the mobile device of the user; and
identifying, from among a plurality of predefined graphical key selection interfaces, a graphical key selection interface that comprises the one or more control icons arranged according to the identified orientation, and
wherein causing display of the one or more control icons in accordance with the determined display arrangement comprises providing, to the mobile device of the user, the identified graphical key selection interface.

15. The method of claim 1, wherein:
determining the display arrangement of the one or more control icons comprises generating a graphical key selection interface that comprises the one or more control icons arranged according to the physical orientation of the one or more physical resources relative to the physical orientation of the mobile device of the user, and
causing display of the one or more control icons in accordance with the determined display arrangement comprises providing, to the mobile device of the user, the generated graphical key selection interface.

16. The method of claim 1, further comprising:
receiving, from the mobile device of the user, a selection of a particular control icon from the one or more control icons; and
enabling the user to use a particular key, from among the one or more keys, that corresponds to the selected control icon to access a particular physical resource from among the one or more physical resources.

17. The method of claim 1, further comprising:
receiving, from a system operated by the credential-issuing organization, the credential and the one or more keys issued to the user by the credential-issuing organization; and
adding the credential and the one or more keys to a user account of the user.

18. The method of claim 1, further comprising:
providing, to the mobile device of the user, a representation of a credential that comprises at least one of a Quick Response (QR) Code, an alphanumeric code, or a short-range wireless code.

19. A system comprising one or more computers and one or more storage devices storing instructions that are operable, when executed by the one or more computers, to cause the one or more computers to perform operations comprising:
receiving information that indicates a location of a mobile device of a user;
identifying one or more physical resources that correspond to the information indicating the location of the mobile device of the user and that are associated with a credential-issuing organization;

identifying one or more keys that are associated with a credential issued to the user by the credential-issuing organization, and that enable the user to access the one or more physical resources associated with the credential-issuing organization;

determining a physical orientation of the mobile device of the user;

determining a display arrangement of one or more control icons that enable usage of the one or more keys based on a physical orientation of the one or more physical resources relative to the determined physical orientation of the mobile device of the user; and causing display of the one or more control icons in accordance with the determined display arrangement.

20. At least one non-transitory computer-readable storage medium encoded with at least one computer program comprising instructions that, when executed, operate to cause at least one processor to perform operations comprising:

receiving information that indicates a location of a mobile device of a user;

identifying one or more physical resources that correspond to the information indicating the location of the mobile device of the user and that are associated with a credential-issuing organization;

identifying one or more keys that are associated with a credential issued to the user by the credential-issuing organization, and that enable the user to access the one or more physical resources associated with the credential-issuing organization;

determining a physical orientation of the mobile device of the user;

determining a display arrangement of one or more control icons that enable usage of the one or more keys based on a physical orientation of the one or more physical resources relative to the determined physical orientation of the mobile device of the user; and causing display of the one or more control icons in accordance with the determined display arrangement.

* * * * *